United States Patent [19]

Blank

[11] Patent Number: 5,577,179
[45] Date of Patent: Nov. 19, 1996

[54] IMAGE EDITING SYSTEM

[75] Inventor: Arthur M. Blank, San Diego, Calif.

[73] Assignee: ImageWare Software, Inc., San Diego, Calif.

[21] Appl. No.: 919,584

[22] Filed: Jul. 23, 1992

Related U.S. Application Data

[63] Continuation-in-part of Ser. No. 844,299, Feb. 25, 1992, Pat. No. 5,345,313.

[51] Int. Cl.$^6$ ..................................................... G06F 15/00
[52] U.S. Cl. ............................................................. 395/135
[58] Field of Search .................................... 395/133, 135, 395/121, 122; 345/113, 114

[56] References Cited

U.S. PATENT DOCUMENTS

| | | | |
|---|---|---|---|
| 3,398,664 | 8/1968 | Bonatsos | 95/14 |
| 3,864,708 | 2/1975 | Allen | 354/290 |
| 4,037,249 | 7/1977 | Pugsley | 358/76 |
| 4,052,739 | 10/1977 | Wada et al. | 358/299 |
| 4,130,834 | 12/1978 | Mender et al. | 358/127 |
| 4,190,856 | 2/1980 | Ricks | 358/88 |
| 4,240,104 | 12/1980 | Taylor et al. | 358/22 |
| 4,258,385 | 3/1981 | Greenberg et al. | 358/22 |
| 4,317,114 | 2/1982 | Walker | 340/721 |
| 4,357,624 | 11/1982 | Greenberg | 358/22 |
| 4,409,618 | 10/1983 | Inaba et al. | 358/183 |
| 4,439,783 | 3/1984 | Nishikawa | 358/22 |
| 4,463,380 | 7/1984 | Hooks, Jr. | 358/160 |
| 4,506,289 | 3/1985 | Shirakami | 358/22 |
| 4,539,585 | 9/1985 | Spackova et al. | 358/93 |
| 4,561,061 | 12/1985 | Sakamoto et al. | 364/550 |

(List continued on next page.)

FOREIGN PATENT DOCUMENTS

| | | |
|---|---|---|
| 084064 | 7/1983 | European Pat. Off. . |
| 0235398 | 9/1987 | European Pat. Off. . |
| 0326515 | 8/1989 | European Pat. Off. . |
| 3422285 | 4/1988 | Germany . |
| 0206098 | 8/1989 | Japan . |
| 2078411 | 1/1982 | United Kingdom . |
| 2253490 | 2/1990 | United Kingdom . |

OTHER PUBLICATIONS

People Postcards? brochure, 1990.
Brochure for People Postcards, 1991.
The World of Photoshop, p. 198 Microtimes, Apr. 13, 1992.
Previews, p. 31 *Publish*, Aug., 1991.
Adobe Photoshop advertisement, 1991.
Picture Publisher advertisement, 1992.
Omura, George, "Learn CAD Now," pp. 167–172, Microsoft Press, 1991.

*Primary Examiner*—Phu K. Nguyen
*Attorney, Agent, or Firm*—Knobbe, Martens, Olson & Bear

[57] ABSTRACT

A system and method for editing digital images in three dimensions includes a computer for storing a digital image of an object and a background, as well as at least one additional background image which includes various components in a three dimensional configuration. The periphery, or edge, of the object has a first hue, and the surrounding background has a second hue. Based upon the difference between the hues and a predetermined hue difference, the computer locates the edge of the object and removes portions of the image (i.e., the background) that are outside the edge. Then, the object can be combined with a preselected one of the other background images so as to form a composite image. Components of the preselected background image are assigned relative positions in the X-Y plane, and are also assigned a value defining their location in one of a plurality of layers which form the Z dimension of the image. The object to be combined with the background is also assigned a value defining its location in at least one of those layers. Optionally, the gamma of the image of the preselected background and the gamma of the image of the object can be matched, thereby making the object appear as if it was imaged under the same lighting conditions as the preselected background.

27 Claims, 28 Drawing Sheets

Microfiche Appendix Included
(125 Microfiche, 2 Pages)

U.S. PATENT DOCUMENTS

| | | | |
|---|---|---|---|
| 4,589,013 | 5/1986 | Vlahos et al. | 358/22 |
| 4,599,611 | 7/1986 | Bowker et al. | 340/721 |
| 4,602,280 | 7/1986 | Maloomian | 358/93 |
| 4,621,280 | 11/1986 | Shinohara et al. | 358/22 |
| 4,636,862 | 1/1987 | Hatori et al. | 358/166 |
| 4,677,460 | 6/1987 | Fass et al. | 358/22 |
| 4,682,297 | 7/1987 | Iwami | 364/521 |
| 4,687,526 | 8/1987 | Wilfert | 156/64 |
| 4,688,105 | 8/1987 | Bloch et al. | 358/335 |
| 4,694,329 | 9/1987 | Belmares-Sarabia et al. | 358/22 |
| 4,698,682 | 10/1987 | Astle | 358/182 |
| 4,710,800 | 12/1987 | Fearing et al. | 358/22 |
| 4,730,260 | 3/1988 | Mori et al. | 364/518 |
| 4,731,743 | 3/1988 | Blancato | 364/521 |
| 4,750,050 | 6/1988 | Belmares-Sarabia et al. | 358/311 |
| 4,782,384 | 11/1988 | Tucker et al. | 358/22 |
| 4,786,944 | 11/1988 | Sakamoto et al. | 355/20 |
| 4,796,180 | 1/1989 | Riley | 364/400 |
| 4,805,037 | 2/1989 | Noble et al. | 358/335 |
| 4,811,084 | 3/1989 | Belmares-Sarabia et al. | 358/22 |
| 4,823,281 | 4/1989 | Evangelisti et al. | 364/518 |
| 4,823,285 | 4/1989 | Blancato | 364/521 |
| 4,827,253 | 5/1989 | Maltz | 340/734 |
| 4,827,344 | 5/1989 | Astle et al. | 358/183 |
| 4,841,378 | 6/1989 | Cogert | 358/335 |
| 4,864,410 | 9/1989 | Andrews et al. | 358/443 |
| 4,872,056 | 10/1989 | Hicks et al. | 358/183 |
| 4,873,568 | 10/1989 | Jackson et al. | 358/22 |
| 4,891,660 | 1/1990 | Biondo, Jr. | 354/412 |
| 4,910,661 | 3/1990 | Barth et al. | 364/167.01 |
| 4,954,883 | 9/1990 | Belmares-Sarabia et al. | 358/22 |
| 4,959,670 | 9/1990 | Thayer, Jr. | 354/76 |
| 4,963,925 | 10/1990 | Miyazaki | 355/77 |
| 4,965,673 | 10/1990 | Bozzo et al. | 358/335 |
| 4,974,172 | 11/1990 | Nakai | 364/521 |
| 5,022,085 | 6/1991 | Cok | 382/1 |
| 5,031,043 | 7/1991 | Rocco et al. | 358/181 |
| 5,053,956 | 10/1991 | Donald et al. | 364/401 |
| 5,117,283 | 5/1992 | Kroos et al. | 358/22 |
| 5,126,847 | 6/1992 | Kori et al. | 358/183 |
| 5,179,642 | 1/1993 | Komatsu | 395/135 |
| 5,196,922 | 3/1993 | Yeomans | 358/22 |
| 5,265,214 | 11/1993 | Nitta | 395/122 |
| 5,343,386 | 8/1994 | Barber | 364/400 |
| 5,375,195 | 12/1994 | Johnson | 395/135 |
| 5,377,314 | 12/1994 | Bates et al. | 395/135 |

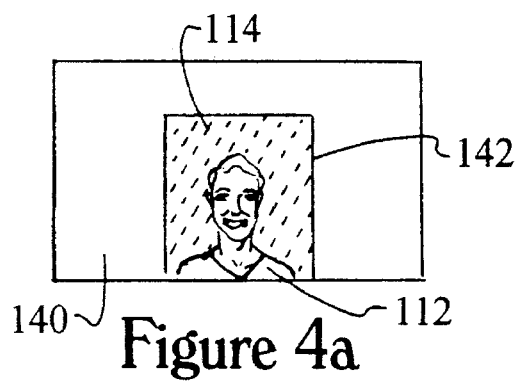 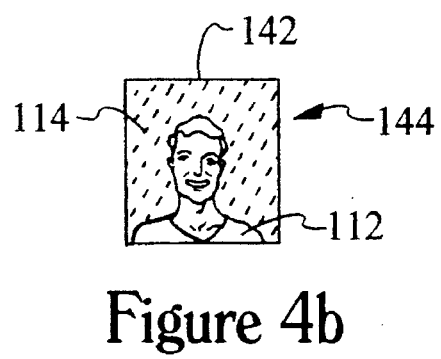
Figure 4a    Figure 4b
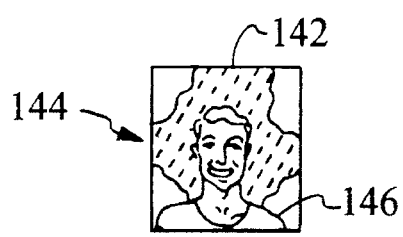 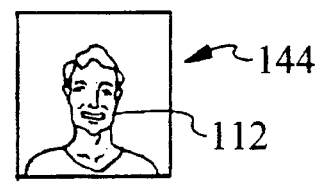
Figure 4c    Figure 4d
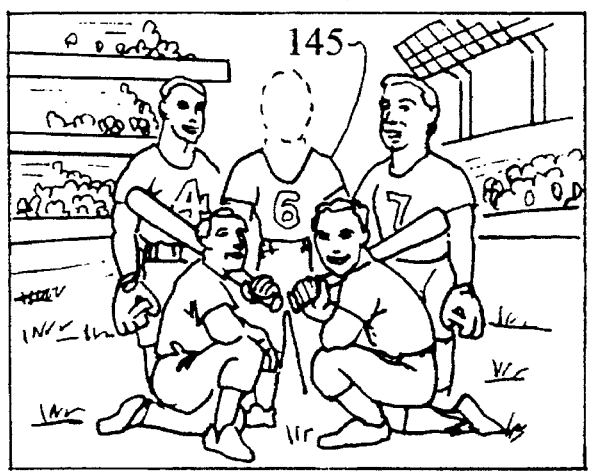 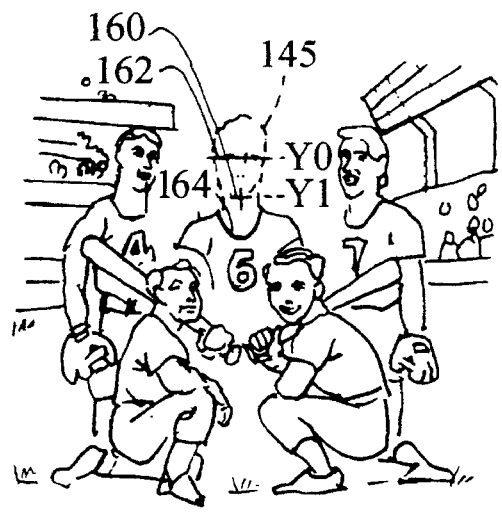
Figure 4e    Figure 4f
Figure 4g

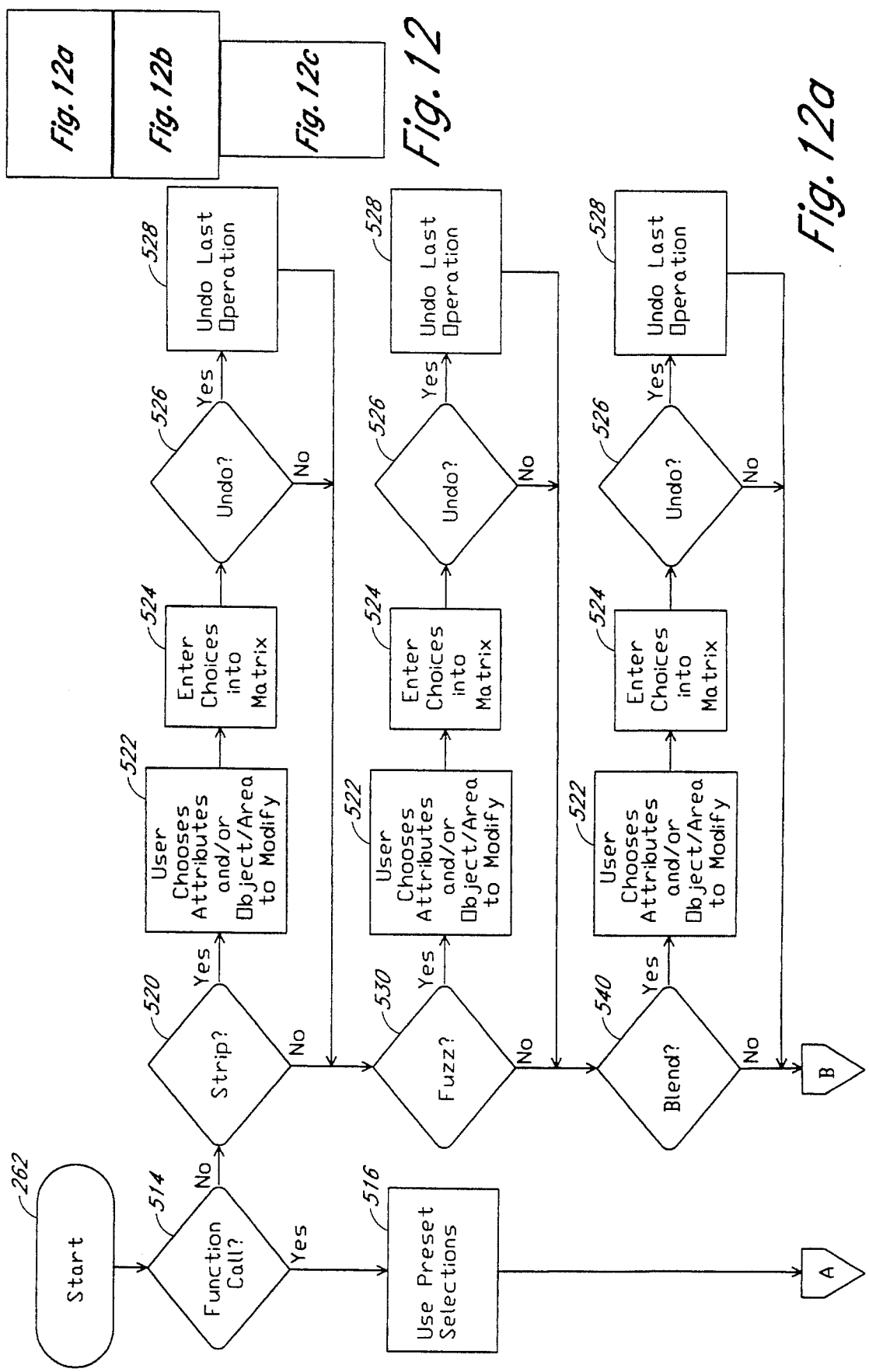

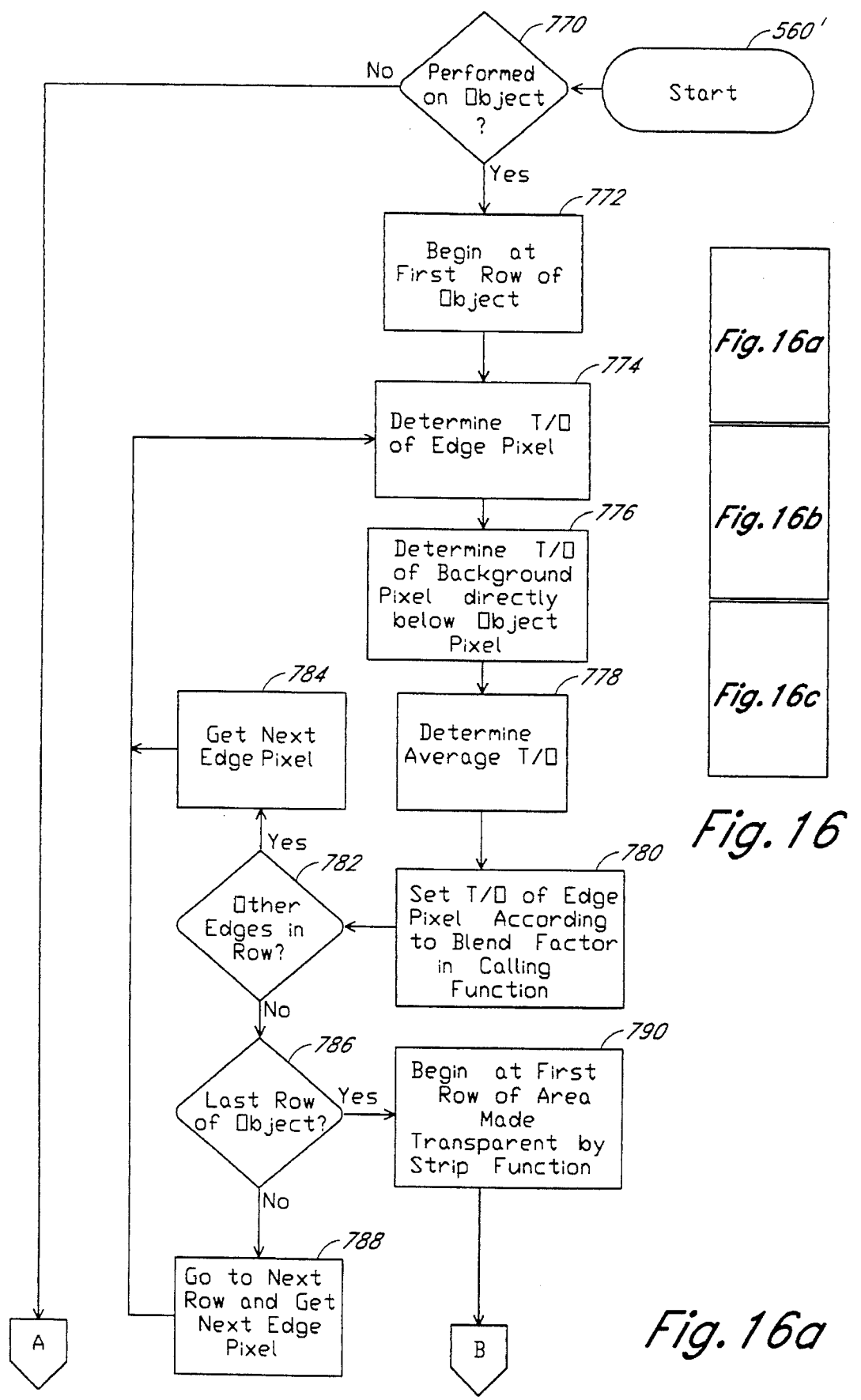

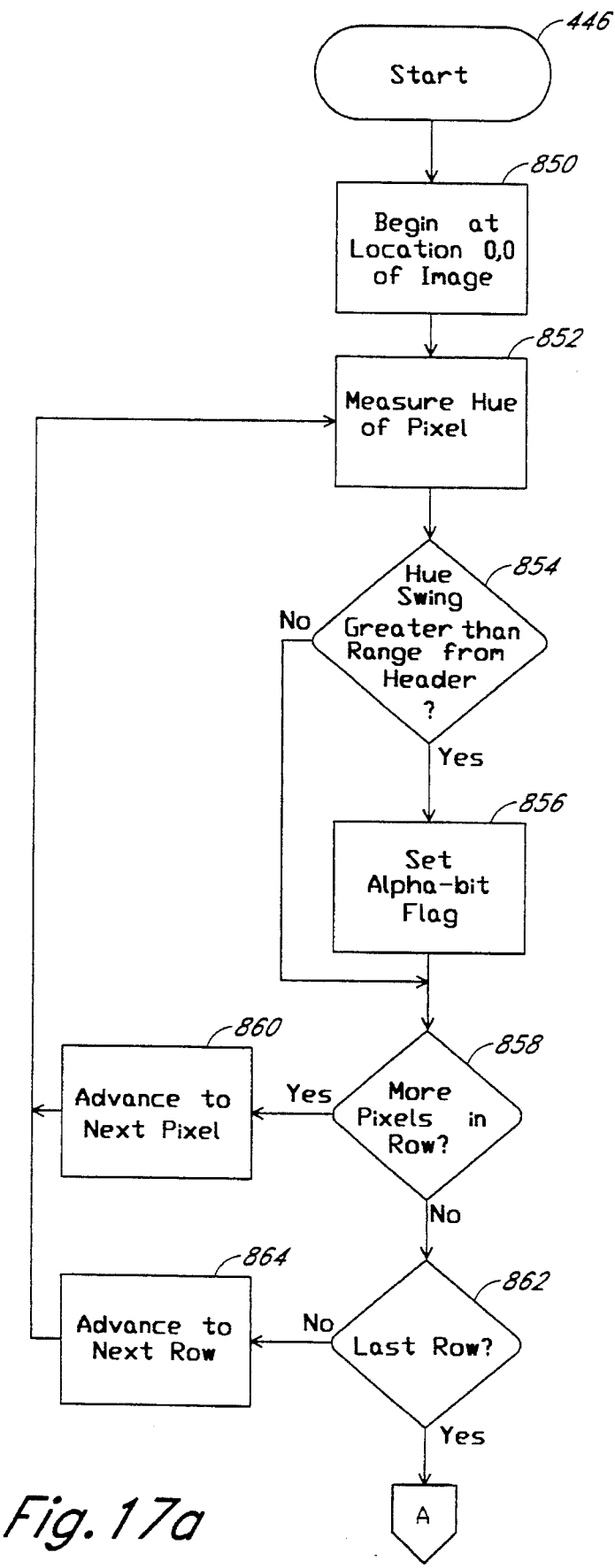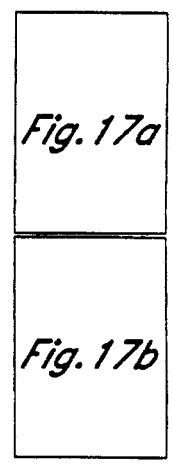
Fig. 17a
Fig. 17

IMAGE EDITING SYSTEM

RELATED APPLICATION

This is a continuation-in-part of application Ser. No. 07/844,299 filed on Feb. 25, 1992, now U.S. Pat. No. 5,345,313.

MICROFICHE APPENDIX

A microfiche appendix containing computer source code is attached. The microfiche appendix comprises 2 sheets of microfiche having 125 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to image processing and, more particularly, to systems for editing digital images.

2. Background of the Technology

A large number of applications require combining one video image with another video image, i.e., a television broadcast of a weather person in front of weather maps during a weather report, so as to produce a composite video image. One well-known technique for producing composite video images is commonly referred to as "chroma-key". The chroma-key technique is so named because it uses the chroma or color information portion of a television signal as a "key" to control the formation of a composite image. A chroma-key device is essentially a video multiplexer which selects a video input signal by feeding the chroma signal from one of the two video inputs to decision logic.

In the case of the above-mentioned weather report application, a television camera is directed at a weather reporter standing in front of a vertical sheet, called a matte, which has a predetermined blue hue or color shade. Hue is the dimension of color that is referred to a scale of perceptions ranging from red through yellow, green, and blue, and circularly back to red. The image of the weather reporter and matte foreground source is provided to the chroma-key device, which is programmed to select all of the video signals received from the camera, except those video signals that represent portions of the image having the predetermined blue hue. Thus, the chroma-key device effectively separates the image of the reporter from the image of the matte.

At the same time that the previously described operation takes place, a video image of a weather map or satellite view of the earth, either of which may be superimposed with city names, high/low temperatures, and the like, is provided to the chroma-key device as a background source. The decision logic of the chroma key device selects the background source as video output wherever a blue hue is detected in the foreground source and presents the resulting background and foreground as a composite picture on a studio monitor that can be viewed by the reporter. The reporter can then point to positions on the matte that correspond to geographic locations on the background source and the viewer of the television program sees a composite image of a reporter and a weather map. Such a composite image is the desired output of a chroma-key device.

However, as was noted in U.S. Pat. No. 4,811,084 to Belmares-Sarabia, et al., a major disadvantage of a chroma-key system is that false keys can be produced. For example, weather reporters wearing blue or striped suits, and even blue eyes, may cause a chroma-key system to produce an incorrectly spliced composite. Also, a chroma-key device is used too large a distance between the reporter and the matte causing reflections resulting from false keying, hence restraining the movements of the reporter.

To overcome the problems inherent in chroma-keying, the Belmares-Sarabia, et al., patent discusses a device for video color detection that does not depend on a single color for keying. For example, such a device is also said to discriminate among similar hues by limiting the bandwidth of the hues and/or hue and saturation combinations that can be recognized by the device.

The device disclosed in Belmares-Sarabia, et al., uses an analog process to multiplex television signals. Analog processes, however, are not as versatile in combining images as are digital processes, which can be programmed to apply sophisticated image processing algorithms to a digitized image so as to alter or edit an image. Thus, it would be an advancement in the technology to provide a digital image editing system which can strip a digital image of an object from a background and combine the digital object with a different digital background or backgrounds (composite) without suffering from the above-mentioned problems and limitations.

Other ways of producing a composite image include image editing software programs running on a Macintosh® computer available from Apple Computer, Inc., or a PC type compatible computer available from IBM and other companies. These programs are exemplified by Picture Publisher® produced by Micrografx, Inc. for the PC and Adobe Photoshop™ produced by Adobe Systems Incorporated for the Macintosh. Picture Publisher is a registered trademark of Micrografx, Inc. Adobe Photoshop is a trademark of Adobe Systems Incorporated. Macintosh is a registered trademark of Apple Computer, Inc.

These programs enable the user to place one object image in front of a background scene and to cut and remove the object image. However, these programs are limited to working with one object only. These programs cannot build a set of layers of objects and backgrounds and allow the user to move an object to different depths or layers into the composite image. In other words, a person could not be placed behind a fence but in front of a house of the background scene simultaneously. Thus, it would be an advancement in technology to provide a system which could place an object in front or behind any other object or the background at any desired depth into the composite image. It would also be desirable to make part of an object which was moved into a particular layer to be transparent based on a desired attribute of the object. For example, one attribute of the object is hue, which is the perceived color shade. The leaves of a tree, which have a particular hue range of green, could be set to be transparent rather than opaque. Thus, the sky would then be seen between the branches of the tree, wherein previously, the leaves had blocked the sky.

When producing a composite image involving the face of a person, one may desire to remove the original person's face and replace it with the face of another person. Frequently the two faces will not be the same size, e.g., one face is a closeup and the other is not, and the person trying to make the composite image will have to reduce or enlarge the replacement face to fit. This may involve numerous trials to achieve a pleasing appearance. Thus, it would be desirable to provide a system which can automatically size the replacement face to provide a natural appearance without a trial and error process.

Another aspect to consider when replacing one face for another is the coloration of the skin. The person making the composite image may be placing a fair complexioned face to replace a dark complexioned face. The rest of the body, such as hands, arms and legs, may be visible in the original image. The composite would therefore not appear natural after the replacement was done. Thus, it would be desirable to provide a system which can automatically match the skin tone of the replacement face to that of the original face without any manual intervention to provide a natural appearance for the resultant composite image.

A further aspect to consider when replacing one face for another in creating a composite image is the positioning of the replacement face. This positioning may involve an iterative process to try different placements to achieve a pleasing and natural appearance. Thus, it would be desirable to provide a system which can automatically position the replacement face at the appropriate location to produce a pleasing appearance for the resultant composite image.

It is often the case that an object is imaged under one lighting condition and is then overlaid on a background that was imaged under another lighting condition. Consequently, the composite image may look artificial. Thus, it would be a further advantage if the editing system could establish the same lighting conditions, or "gamma" for the entire composite image. For example, it may be desirable to have an object that was imaged under fluorescent light inserted into a background that was imaged under full daylight and have the composite image maintain the same lighting condition. The lighting condition of the composite image could even be a third condition such as moonlight.

Accordingly, a need exists to provide a digital image editing system which can separate the digital image of an object from a background against which the object was imaged. It is a further purpose of the present invention to provide a digital image editing system which can automatically size, position, and layer the digital image of a replacement object or multiple objects into a predetermined background at a desired depth, and then match the lighting conditions of the replacement object with one or more original objects and the background, and to provide a digital image editing system that is easy to implement and cost-effective to use.

SUMMARY OF THE INVENTION

The present invention satisfies the above-mentioned needs and includes a system and method for selectively combining digital images. The system includes a computer, which is connected to a device, such as a video camera, that can generate a signal representing an image. An object, for example, a human, is positioned in front of the video camera, and the video camera generates a signal representing the object and the background that is behind the object.

Accordingly, the signal from the camera includes an object component representative of the image of the object and a background component representative of the image of the background. The object has an edge, and the computer detects the edge of the object and separates portions of the image that are outside the edge of the object (i.e., the background component) from portions of the image that are inside the edge (i.e., the object component).

In one embodiment, the background has a single continuous hue, and based upon the difference in hue between the object and background, the computer determines the location of the edge of the object. Based on this determination, the computer removes the background component from the signal.

More particularly, the video camera produces through digitization a digital signal that is comprised of a plurality of pixels that are arranged in rows. Each pixel has a hue gamma and each hue gamma has a corresponding numeric value which represents how light or dark the hue is. The computer determines the location of the edge of the object by first ascertaining the numeric value of the hue gamma of a first pixel that is located at the end of the top row of the video window (i.e., is located at the periphery of the video image). The computer also determines the numeric value of the hue gamma of an adjacent second pixel in the row, and then compares the difference between the gammas to a predetermined difference.

When the difference between the hue gamma of the first pixel and the hue gamma of the second pixel is less than the predetermined difference, the computer compares the hue gamma of the second pixel with the hue gamma of a third pixel that is located in the same row as the first and second pixels and is adjacent to the second pixel, and so on. When the difference between any two pixels exceeds the predetermined value, this indicates the presence of a portion of the edge of the object. The computer then stores the location of the edge portion in memory, and then repeats the process described above for the row immediately below the top row of pixels. If desired, the computer can simultaneously perform a process like the one described above, but working from another direction, such as upwardly from the bottom row of pixels.

The computer continues the process, i.e., working inwardly from the boundary of the video window in the pixel-by-pixel comparisons, until the entire edge of the object has been mapped. After mapping the edge of the object, the computer is ready to "strip" (i.e., remove) the background component from the object component by setting all background pixels to a preselected transparent value.

After stripping away the background image from the object image, the computer can, if desired, integrate the object image into a preselected background image that is different than the background against which the object was imaged. More particularly, the computer can have one or more preselected background images stored in the memory of the computer. The computer can selectively digitally combine the object component of the signal with multiple signals which are representative of multiple layers or planes of these stored backgrounds, together with optional text entered by an operator or user of the system and present the composite image on a video display. Thus, the image of the object can be combined, if desired, with a preselected background that is different from the background against which the object was imaged, user text added, if desired, and the composite image displayed.

Stated differently, the computer can essentially function as an image combiner by stripping, from a digital video signal, the image of an object from the image of the background in front of which the object was positioned. The computer then combines the image of the object with a preselected image. Specifically, stored in the memory of the computer is a two-dimensional digital image representation of a three-dimensional field of view, with components of the digital image assigned layer values to define their position in the three-dimensional field of view. The computer then blends the object into the selected background at the desired layer and X-Y position, so that the object appears to be integrated into the three-dimensional field of view.

Preferably, to further blend the object into the preselected image, the computer averages the hue of edge of the object and the hue of the portion of the preselected background that is contiguous to the edge. The computer then adjusts the hue of the edge of the object to equal the averaged hue.

Additionally, the computer of the present invention can adjust the gamma of one or both of the object and the preselected stored background, to make the integrated image appear as if the object was imaged under the same lighting conditions as the preselected stored background. For example, the computer can ascertain the gamma of the preselected background, and then adjust the numeric value of the hue of the pixels that make up the image of the object as appropriate to make the object appear as though it were imaged under the same lighting conditions under which the preselected background was imaged.

The system of the present invention can also include a video printer electrically connected to the computer for generating a picture of the object. Also, the system may include a currency acceptor which is operably engaged with the computer for accepting currency and activating the system in response to the insertion of currency into the acceptor. Thus, the system may, in one application, be used in conjunction with electrical imaging booths that are installed in public places for use by the public.

The system of the present invention automatically sizes the object image to naturally integrate into the composite image. The computer compares the original background object size to that of the replacement object and adjusts the size, if necessary, of the replacement object.

The system of the present invention automatically positions the object image to naturally integrate into the composite image. The computer utilizes the address of a predetermined location on the original background object and transfers that address to a predetermined location of the replacement object.

These and other objects and features of the present invention will become more fully apparent from the following description and appended claims taken in conjunction with the accompanying drawings, in which like numerals refer to like parts.

BRIEF DESCRIPTION OF THE DRAWINGS

FIGS. 4a, 4b, 4c, 4d, 4e, 4f, 4g, and 4h are a sequence of images exemplary of those produced by the imaging system in performing the process steps shown in FIG. 3;

FIGS. 12a, 12b and 12c are a flow diagram of the top-level gamma function defined as block 262 in FIG. 3;

FIGS. 16a, 16b, and 16c are a flow diagram of the transparency/opacity function corresponding with block 560 in FIG. 12; and FIGS. 17a and 17b are a flow diagram of the gradient sharpening function defined as block 446 in FIG. 9.

DETAILED DESCRIPTION OF THE PREFERRED EMBODIMENT

Figure 1:
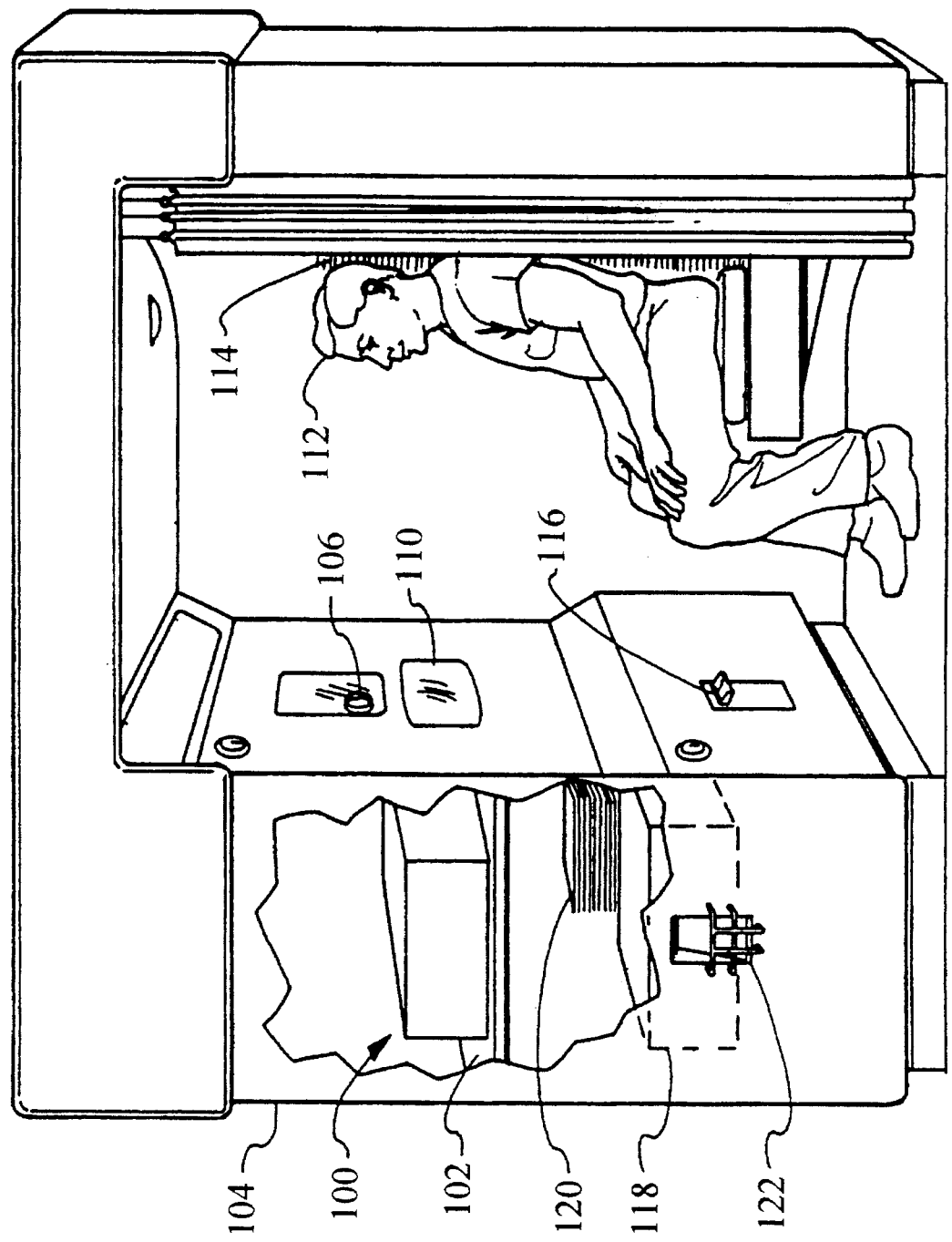
FIG. 1 is a perspective view of a presently preferred embodiment of the imaging system of the present invention, with portions cut away and shown in phantom, and with a human subject sitting in front of a background of a single hue.

Referring initially to FIG. 1, a presently preferred embodiment of a digital image editing system of the present invention is generally indicated at 100. It is to be understood that the imaging system 100 can be used in virtually any application where it is desirable to separate an object from a background in a digital image, and then combine the object with a different background to form a composite image.

One such application is shown in FIG. 1, which shows that the system 100 can be mounted by brackets 102 within an automated electrical imaging system 104. Certain features of the apparatus 104 are described in co-pending U.S. patent applications identified as Ser. No. 669,664, and Ser. No. 844,299 and assigned to the same assignee as the present application, which applications are hereby incorporated herein by reference. The apparatus 104 includes a video camera 106, such as a model VKC-360 camera available from Hitachi Corp., and which is electrically connected to the system 100.

Still referring to FIG. 1, a video monitor or display 110, such as a Kodak model 1310 RGB/CGA touch screen display, is mounted in the apparatus 104. The monitor 110 is electrically connected to the system 100 for displaying a video image, such as the image of a person 112. As shown, the person 112 using the system (the user) in FIG. 1 is sitting in front of a monochrome background 114, which can be any desired color.

As shown in FIG. 1, the apparatus 104 also includes a payment-receiving device 116, such as a model OB-A4 device made by Rowe. The presently preferred embodiment uses the device 116 to accept currency as payment. However, other embodiments may accept other forms of payment, such as credit cards and tokens. Further, the apparatus 104 includes a printer 118 which is filled with blank sheets of card stock 120. Following deposit of an appropriate amount of currency in the device 116, or following other initiation, the image of the person 112 can be printed on one of the sheets 120 and dispensed into a printer bin 122. In one presently preferred embodiment, the printer 118 is a model SV6510 color printer available from Kodak.

Figure 2:
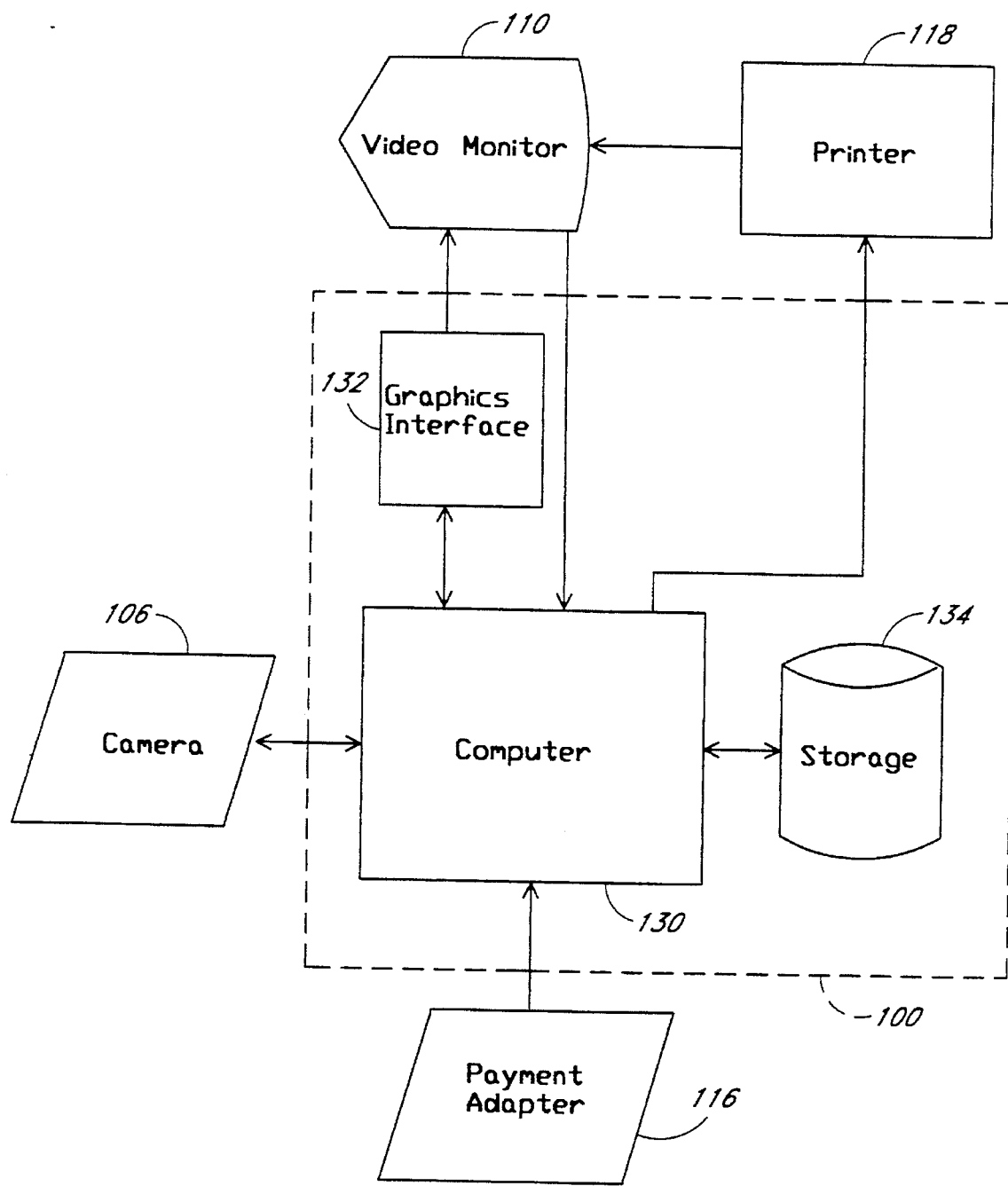
FIG. 2 is a block diagram illustrating the components of the imaging system of FIG. 1.

Referring now to FIG. 2, the system 100 is shown to include various electronic components. As indicated in FIG. 2, the system 100 includes a digital computer 130, preferably an IBM PC compatible having a 80386 microprocessor operating at 33 MHz and having eight Megabytes (Mb) of memory. As shown, the computer 130 is electrically connected to the video camera 106 and payment adapter 116 for receiving input signals therefrom. Also, the computer 130 is electrically connected to a suitable graphics or video interface card 132, preferably a Targa®+ 16–32, available from Truevision having two Mb of video memory. Targa is a registered trademark of Truevision, Inc. The video memory on the graphics interface card 132 may store, at various times, a digital representation of part of the person 112 (FIG. 1), a background scene, and instructions screen information for the user. The graphics interface card 132 in turn is electrically connected to the touch screen video monitor 110. The user of the system 100 can respond to prompts given by the system by either touching or touching and then moving, (dragging) a location on the video monitor screen. A RS232 (serial format) digital connection from the video monitor 110 to the computer 130 then provides for the transfers of the user input to the system 100.

The computer 130 connects to the printer 118 via a Centronics compatible interface. The printer 118 is further connected to the video monitor 110 via an analog interface. FIG. 2 also shows that if desired, an electronic storage device 134, such as a hard disk drive, can be connected to the computer 130. In the presently preferred embodiment, the hard disk 134 has a capacity of 120 Mb.

Figure 3:
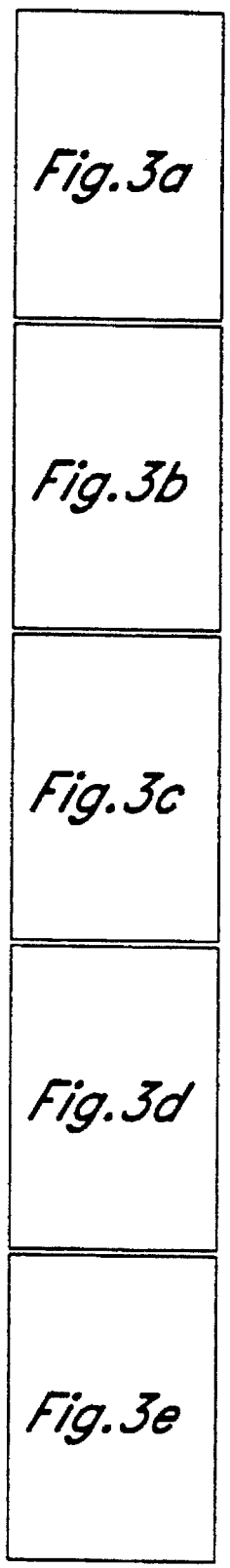
FIGS. 3a, 3b, 3c, 3d and 3e are a top-level flow diagram of the imaging system, used in conjunction with the monochrome background of FIG. 1.
Figure 3A:
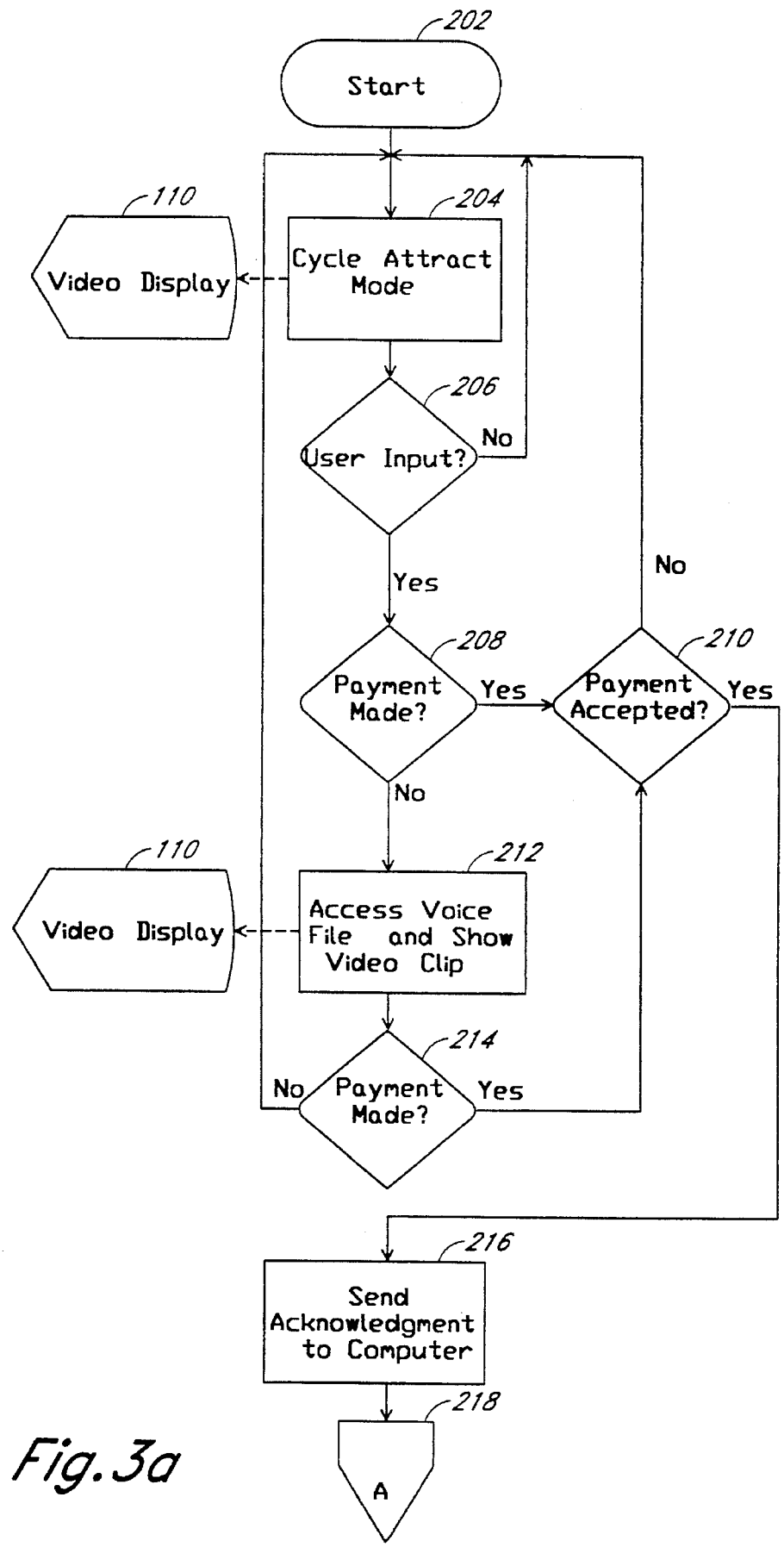
Figure 3B:
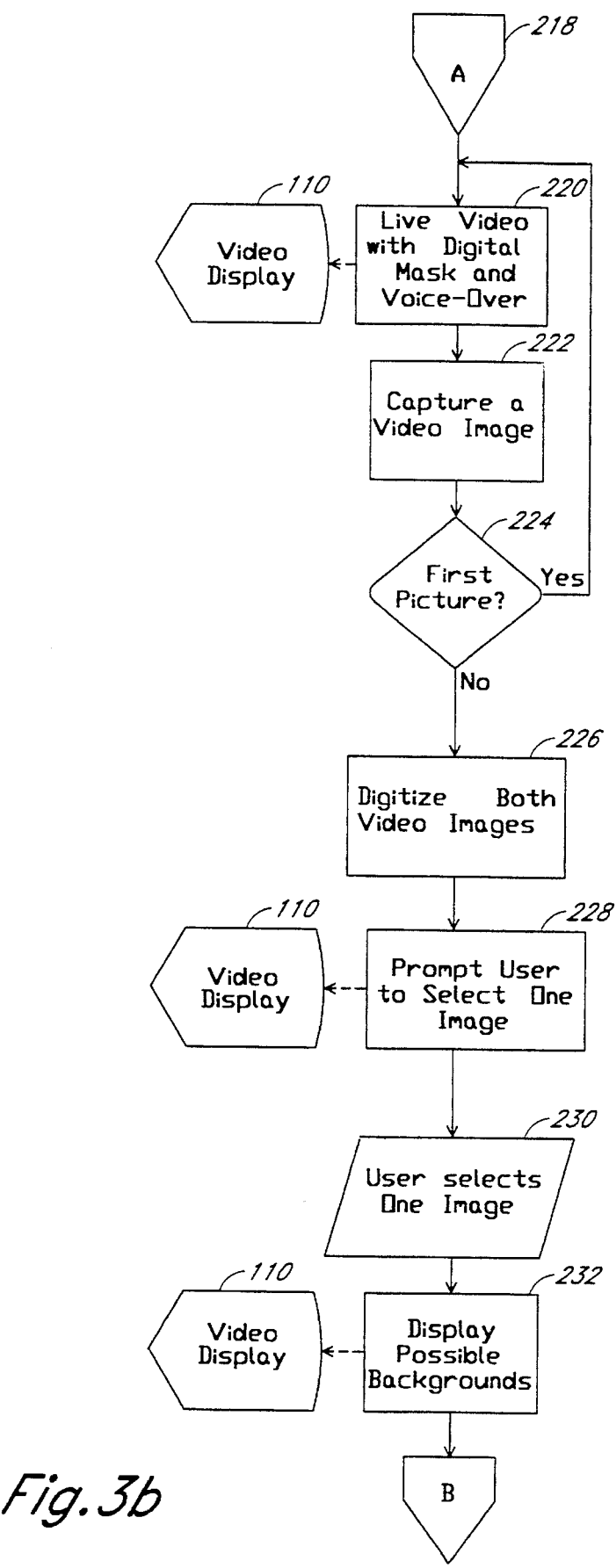

Now referring to FIGS. 1, 3a, 3b, 3c, 3d and 3e the operation of one presently preferred embodiment of the imaging system 100 will be described. FIGS. 3a,b,c,d and e show the main or top-level control flow for the system 100. For the specific embodiment shown in FIG. 1, execution begins at a start step 202 of FIG. 3a and proceeds to a step 204 wherein a set of background scenes is displayed on the video monitor 110 (FIG. 1) to attract the attention ("attract" mode) of a potential user of the system 100. Periodically the computer 130 proceeds to a decision step 206 to check if someone has either touched the monitor screen 110 (FIG. 1) at an appropriate location or inserted payment into the payment adapter 116 (FIG. 1). If there is no user input at step 206, the computer 130 loops back to step 204 to continue the "attract" mode.

When there is user input at step 206, a decision step 208 then checks whether the user inserted payment into the payment adapter 116, in which case the computer 130 proceeds to a decision step 210. At step 210, the payment is tested to determine if it is the proper amount and is genuine. In the preferred embodiment, the system 100 accepts only a five dollar bill. However, a configuration file (not shown) used by the computer 130 allows a technician to alter the type of payment that is accepted, e.g., five one dollar bills. At step 210, if the payment is rejected for any reason, the computer loops back to step 204 to begin again.

If step 208 determines that the user payment has not been made, the computer 130 proceeds to step 212. At step 212, a voice file from a sound board in the computer 130 and voice driver activate to instruct the user to insert five dollars. Sound boards, such as Sound Blaster® from Creative Labs or Thunder Board™ from Media Vision are readily available. Sound Blaster is a registered trademark of Creative Labs, Inc. Thunder Board is a trademark of Media Vision, Incorporated. A video clip, having instructions on how to make payment, is stored on the storage disk 134 (FIG. 2) and is shown on the monitor screen 110 for about fifteen seconds. A check is made at a decision step 214 during the fifteen seconds to determine if payment has been made. If not, the computer loops back to step 204 to begin again. If payment is made at step 214, step 210 tests for correct payment. If the payment is correct, the computer moves to step 216 wherein a RS232 acknowledgement is sent to the computer 130. The main control flow leaves FIG. 3a through the off-page connector A 218 and resumes again at step 220 in FIG. 3b.

At step 220, live video with a digital mask 140 (FIG. 4a) is shown on the video display 110. A voice file from the computer 130 activates to give the user instructions. FIG. 4a illustrates what the user 112 may see on the video display 110. A box 142 delineates the edge of the digital mask 140 and defines a specific region where the head of the user 112 needs to be. Voice instructions prompt the user 112 to sit back or to raise or lower the provided stool (not shown) if the head is not within the box 142. When the user's head fits properly within the box 142, further processing is not necessary to shrink the head size. The digital mask 140 is a monochrome hue that is configurable by a technician.

Moving from step 220 to step 222 (FIG. 3b), the computer 130 activates the video camera 106 (FIG. 2) and a video signal is captured representative of an object, e.g., the person or user 112, and a background against which the object was imaged, e.g., the continuous hue background 114 (FIG. 4a). The computer 130 proceeds to a decision step 224 to determine if this is the first picture or image captured. If so, the computer 130 loops back to step 220 and step 222 to capture a second pose of the user 112. When step 224 determines that two images are captured, the computer 130 proceeds to step 226 wherein both video images are digitized. Of course, the system could be modified to receive and process only one or more than two images.

As shown in FIG. 4a, only a portion 142 of the camera view is digitized for processing by the computer 130. Ordinarily, the signal from the camera 106 is an analog signal, and is digitized into a two-dimensional matrix of pixels or image 144 (shown in FIG. 4b) by a video frame grabber on the Truevision Targa+ card 132. In the presently preferred embodiment, the matrix of pixels 144 is 512×486, which is a digital video rectangular standard, although other matrix sizes can be used such as 640×480 or higher.

After both images have been digitized, the computer moves to step 228 wherein both images are displayed on the video display 110 (FIG. 1) and a voice file instructs the user 112 to pick one of the two images to be used for the rest of the process and to touch that image on the monitor screen 110 at step 230. The selected image 144 is stored in the video memory of the graphics interface card 132 (FIG. 2). After the user 112 makes the necessary selection at step 230, the computer 130 proceeds to step 232. At step 232, a set of different background scenes are displayed on the video display 110. For example, the background scenes could be of sports team members in various poses with their equipment, either individually or in groups. In the preferred embodiment, the computer 130 displays a preselected set of background scenes, but in other embodiments, the user may be able to select a different set to choose among, e.g., another sports team. Other embodiments may allow the user to pick which person, from a group of people in a scene, that the user would like his picture to replace. This choice may be done by pointing to a person, pointing to the name or title of a person, or other ways of selecting the location for replacement. The user 112 is prompted at step 232 to select one desired background scene by touching the appropriate scene on the video screen 110 (FIG. 1).

Figure 3C:
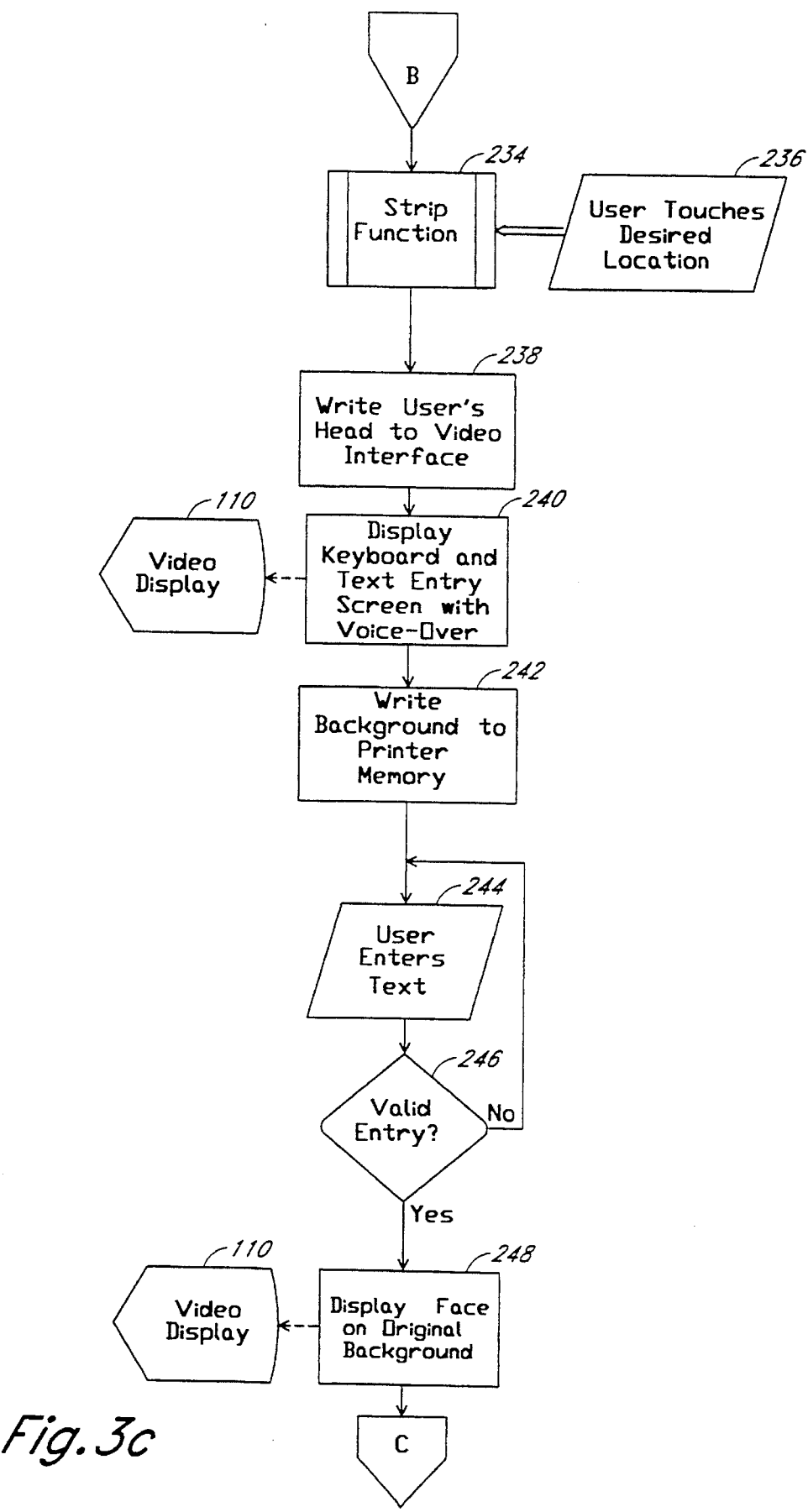

Preceeding through off page connector B to FIG. 3c, while the user is deciding which background scene to select, the computer executes a function 234 to strip portions of the image selected by the user at step 230. Function 234 will be explained in detail hereafter. When the user 112 touches the monitor screen 110 (FIG. 1) at step 236 to select the desired background scene, an interrupt is sent to the computer 130 to denote that the selection has been made. In the meantime, when the function 234 returns from execution, the computer 130 moves to step 238 wherein the results of function 234, i.e., the image of the user's head and neck along with the stripped background pixels, is written to the video memory on the graphics interface card 132 (FIG. 2). When the interrupt indicating the selection of the background scene from step 236 is received by the computer 130, the control flow 200 continues at step 240.

At step 240, a personal computer keyboard and text entry screen along with instructions to the user 112 are displayed on the video monitor 110. A voice file from the computer 130 activates to give the user oral instructions. The user is prompted to enter text, such as the user's name or another name, to personalize the final composite image. While the user 112 is thinking about the text to enter, the computer 130 moves to step 242 where the background scene selected by the user at step 236 is sent to a frame store in a memory of the printer 118. As shown in FIG. 4e, in the preferred embodiment, the background scene sent to the printer 118 will be missing the head and neck of a preselected person 145 in the original computer-stored scene. In other embodiments, the person in the original computer-stored background scene that is chosen to be replaced by the user (from multiple people in the scene) will be sent to the printer frame store without the head and neck. While the background is being written to the printer frame store at step 242, the user can press locations on the touch screen monitor 110 to choose characters composing the desired text at step 244. A location on the touch screen monitor 110 is provided to indicate completion of the text upon which the computer proceeds to a decision step 246. At step 246, a check is done to determine if a valid text entry has been made. If not, the computer 130 loops back to step 242 where locations are provided on the touch screen monitor 110 to correct the text entry.

After a valid entry has been determined at step 246, the computer 130 moves to step 248 wherein the image of the face (FIG. 4b) selected by the user 112 at step 230 is displayed on the video monitor 110 along with the original monochrome background present when the user's picture was taken. After completion of step 248, the main control flow 200 leaves FIG. 3e through the off-page connector C and resumes at step 252 in FIG. 3d.

At step 252, the computer 130 draws a horizontal reference line on the video display 110 and prompts the user 112 to touch and drag (move while touching) the reference line over the pupils of the eyes. At step 254 the user 112 centers the horizontal line over the pupils and presses a button location on the touch screen monitor 110 to signal completion of the step. Moving from step 254 to step 256, the computer 130 draws a reference cross on the video display 110 and prompts the user 112 to touch and drag the reference cross to the bottom of the chin and centered on the neck. At step 258 the user 112 centers the reference cross on the middle of the neck and bottom of the chin, and then presses a button location on the touch screen monitor 110 to signal completion of step 258. The monitor 110 has a display similar to FIG. 4g but including the monochrome background 114.

Figure 3D:
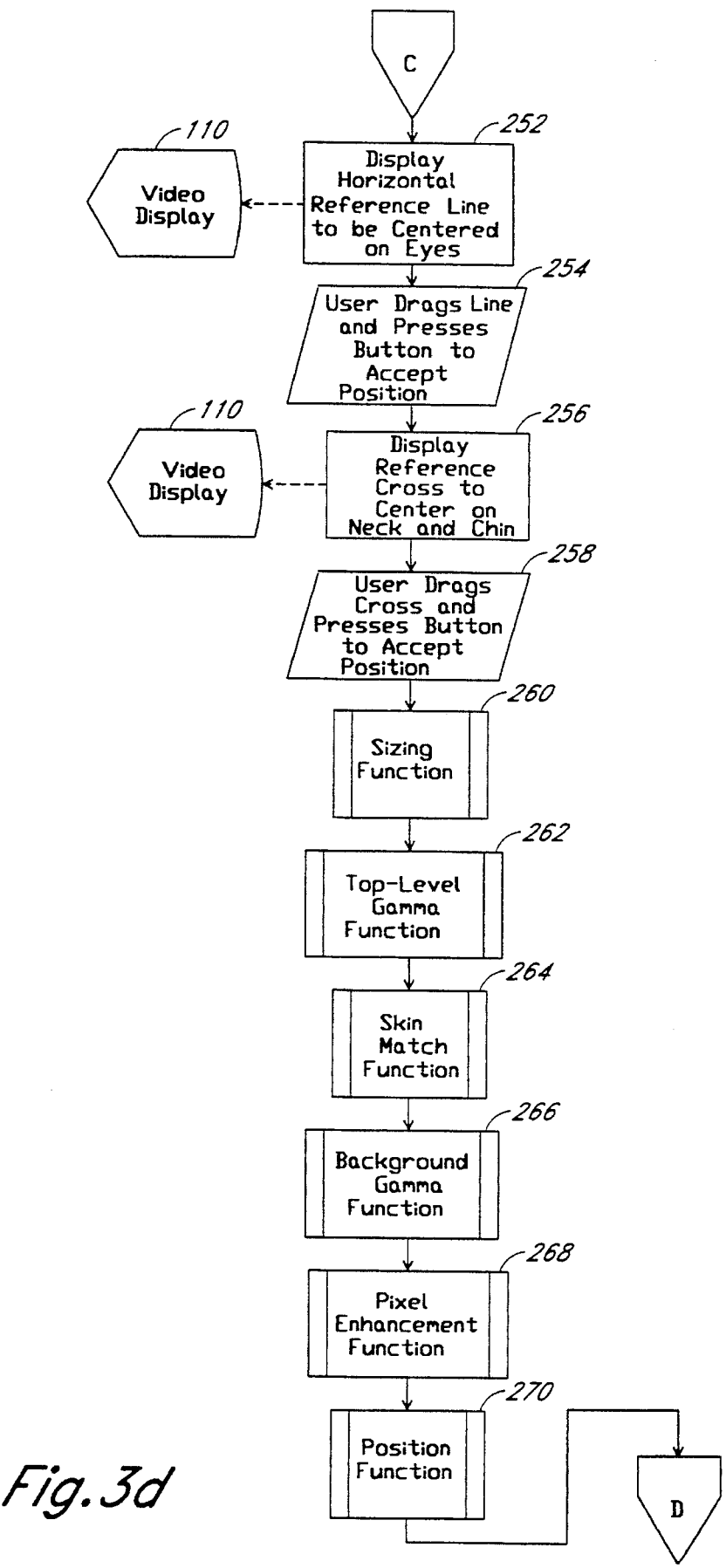

Upon completion of step 258 in FIG. 3d, the computer calls a function 260 to match the size of the user's face, as determined by steps 252 through 258 above, to the size of the face to be replaced of the previously selected person 145 (from step 236). The function 260 will be described below after the remainder of the main control flow 200 is described. After the function 260 returns, the computer calls a function 262 to change various gamma values.

The overall gamma includes many attributes: hue (H), saturation (S), lightness (L), intensity (I), contrast (C), red (R), green (G), blue (B), and combinations thereof such as HSL, HSI, HSC and RGB. The top-level gamma function 262 can change any combination of the gamma attributes by: pixel, area of the image or the entire image. For example, the user can change the hue, saturation and intensity of an area of the image. Other operations done by the top-level gamma function include: strip, fuzz, blend, transparency/opacity, and pixel enhancement. These functions, and the apparatus and method for accomplishing them, are disclosed hereafter in this document. For example, the user could choose to only enhance the pixels of a particular hue of blue, and blend the pixels of a certain saturation level. Any combination of gamma attributes and operations could be done.

To more fully understand the application of the top-level gamma function 262, as well as other aspects of the invention, one should appreciate that the composite final image is handled by the computer 130 on a layer basis, where each pixel on a layer has X,Y Cartesian coordinates. Thirty two layers are used in the presently preferred embodiment, but in other embodiments the numbers of layers may be greater, with the maximum number only being limited by the size of the memory. The final composite image is viewed with the layers stacked on top of each other. The layer number provides a Z coordinate with the original background scene having a Z coordinate of zero. Objects in the original background scene can be chosen to have a higher or the same priority or similar and hence be assigned to a higher numbered layer and Z coordinate. Other objects, such as the image of the user 112, can be assigned a Z coordinate and be placed in front of or behind objects (depending on their Z coordinate) from the background scene which were previously moved from layer zero.

Figure 4H:
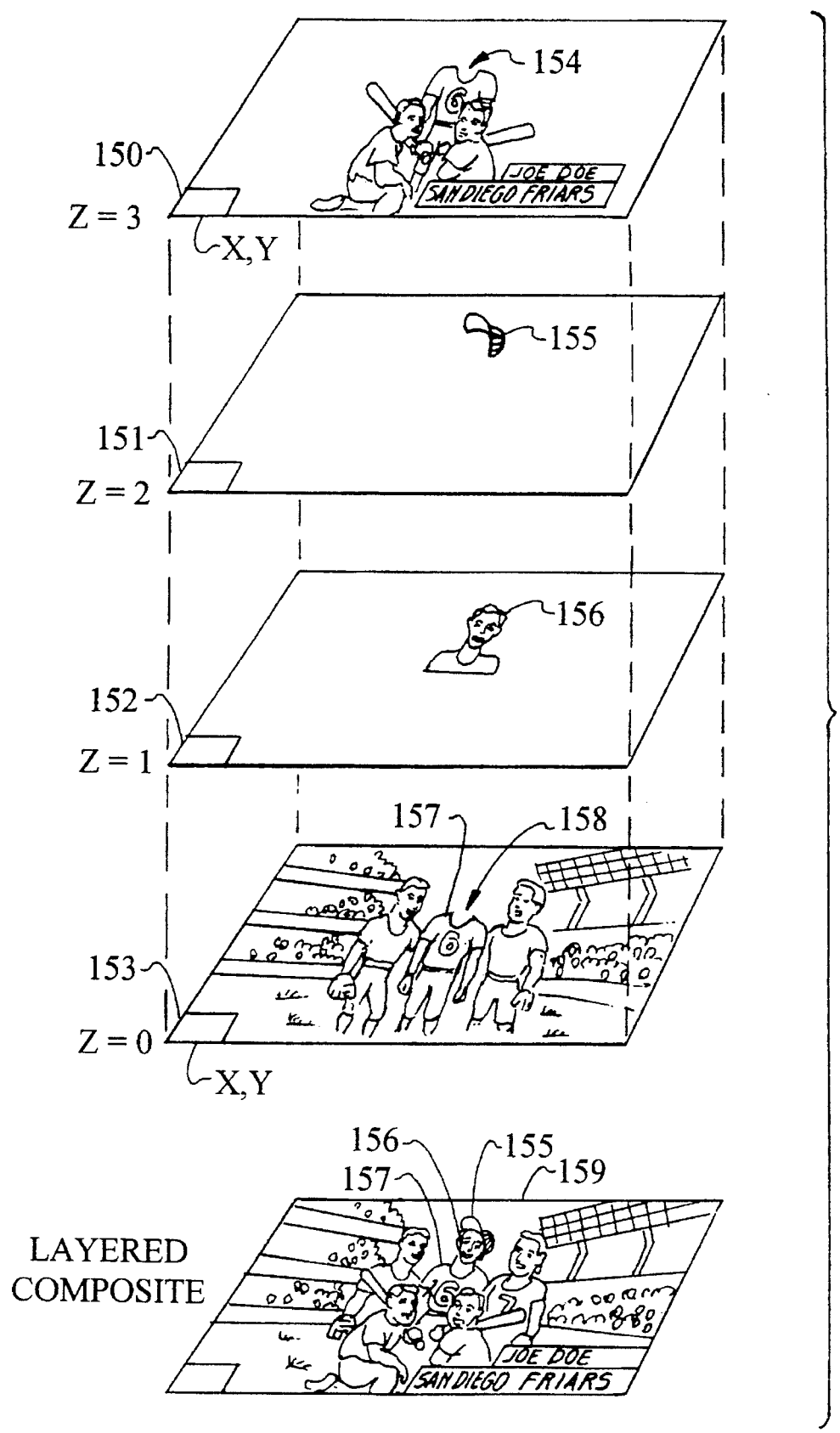

As an example, consider a final composite image having four layers (Z=0 to 3) as shown in FIG. 4h. If a pixel 150 at a particular X,Y cartesian coordinate address of the top layer (Z coordinate=3) has an attribute of transparent, then a pixel 151 at the same X,Y coordinate on the layer below (Z=2) will be seen if the attribute is opaque. However, if the pixel 151 of layer Z=2 is also transparent, then a pixel 152 at the same X,Y coordinate on layer Z=1 will be seen if it has an attribute of opaque and so on. For a pixel 153 on the background or Z=0 layer to be seen, all pixels on higher numbered layers for that X,Y coordinate address must all have an attribute of transparent.

In further explanation of FIG. 4h, several objects have been moved from the original background layer (Z=0): two kneeling players 154 to the top layer (Z=3) and a hat 155 to the Z=2 layer. The head of the user 112 is placed as an object 156 on the Z=1 layer. The person 157 in the background scene whose head is to be replaced has the head area 158 set transparent. The final layered composite image 159 illustrates the user's head 156 wearing the hat 155 on the body of the person 157.

All the previously mentioned gamma attributes and operations can be done on a layer by layer basis. For example, the user can strip pixels of a particular hue of red from layer 1, 2 and 3, followed by sharpening pixels of a certain value of intensity on layers 0 and 1, and finishing with fuzzing all pixels with a desired saturation level on layers 1 and 3. Details of the top-level gamma function 262 will be given below.

After a return from the function 262, the computer 130 calls the function 264 to match the skin of the user 112 to the skin of the selected background person 145 (FIG. 4e). The function 262 will be described below.

After the function 264 returns, the computer 130 calls the function 266 to match the gamma of the user image and the gamma of the selected background scene (FIG. 4e), as selected at step 236. The function 266 will be described below.

In the presently preferred embodiment, after the function 260 returns, the main control flow 200 will move to function 268 and bypass functions 262, 264, and 266 (this bypass is not shown in FIG. 3d). However, it can be appreciated that the functions 262, 264, and 266, are included in other embodiments.

After the function 266 returns, the computer 130 calls the function 268 for pixel enhancement. The function 268 will be described below.

After the function 268 returns, the computer 130 calls a function 270 to position the object into the selected background scene (FIG. 4e). The function 270 will be described below.

Figure 3E:
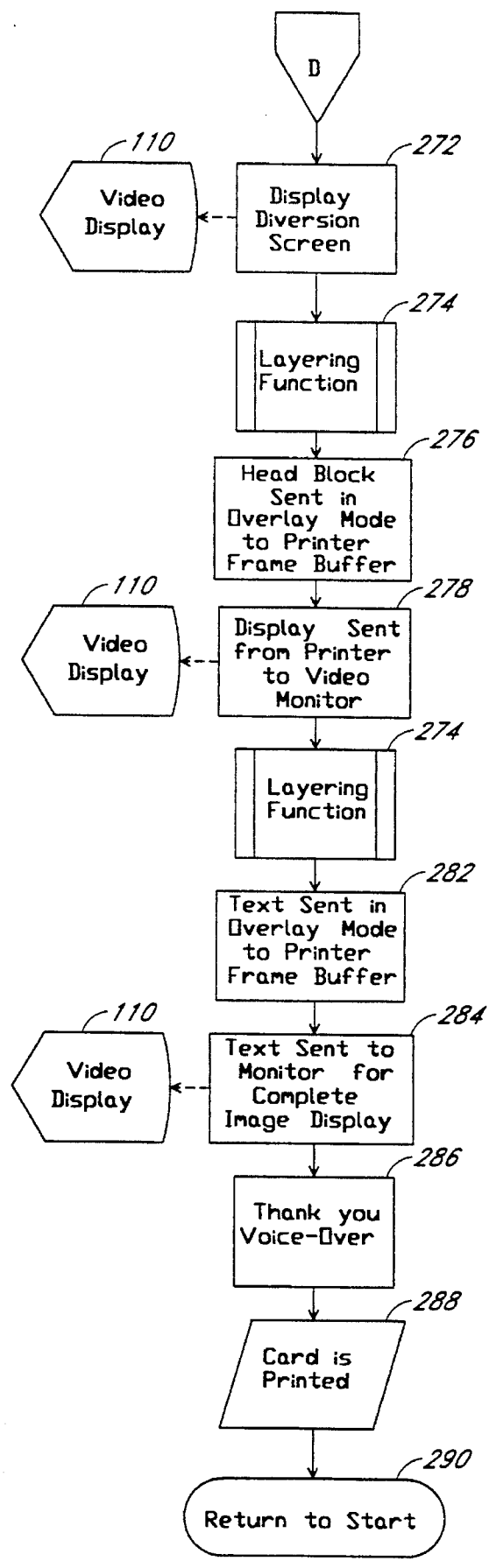

Upon return from the function 270, and proceeding through off page connector d to FIG. 3e, the computer 130 will display, at step 272, a diversion screen, e.g., a team logo, on the video monitor 110 along with a message that the final image will be ready soon. While the diversion screen is displayed, the computer 130 proceeds to step 274. At step 274, the computer 130 calls a function to layer the image of the user's head and neck into the background scene chosen at step 236. The function 274 will be described below.

After the function 274 returns, at step 276, the computer 130 sends the user's head and neck block, as processed by the layering function, to the frame buffer of the printer 118 in overlay mode. In overlay mode, the block currently sent to the frame buffer overwrites the previous information in the buffer starting at a defined location associated with the current block. The information previously in the frame buffer outside of the area for the block being overlaid remains unchanged. The final composite image is built up at the printer memory. Previously, the background scene was sent to the memory of the printer 118 at step 242.

Upon completion of step 276, the computer 130 moves to step 278 where the composite image, which is almost complete, is sent from the printer memory to the video display 110. The computer 130 then proceeds to call the layering function 274 again to layer the personalization text that the user entered at step 244. When the layering function 274 returns, the computer 130 proceeds to step 282 where the personalization text is sent in overlay mode to the frame buffer of the printer 118. At this point, the final composite is complete in the printer memory. The computer 130 moves to step 284 where the personalization text is sent from the printer memory to the video display 110 to show the final composite image to the user 112 for a few seconds. As the final composite image is being displayed, the computer 130 moves to step 286 where a voice file from the computer 130 activates to thank the user 112 for using the system 104. The computer 130 then signals the printer 118 at step 288 to print the final composite image on the printer card stock 120 and release the printed product into the printer bin 122. After the final composite image is printed at step 290, the main control flow 200 returns to step 202 and begin the whole process again.

Figure 5:
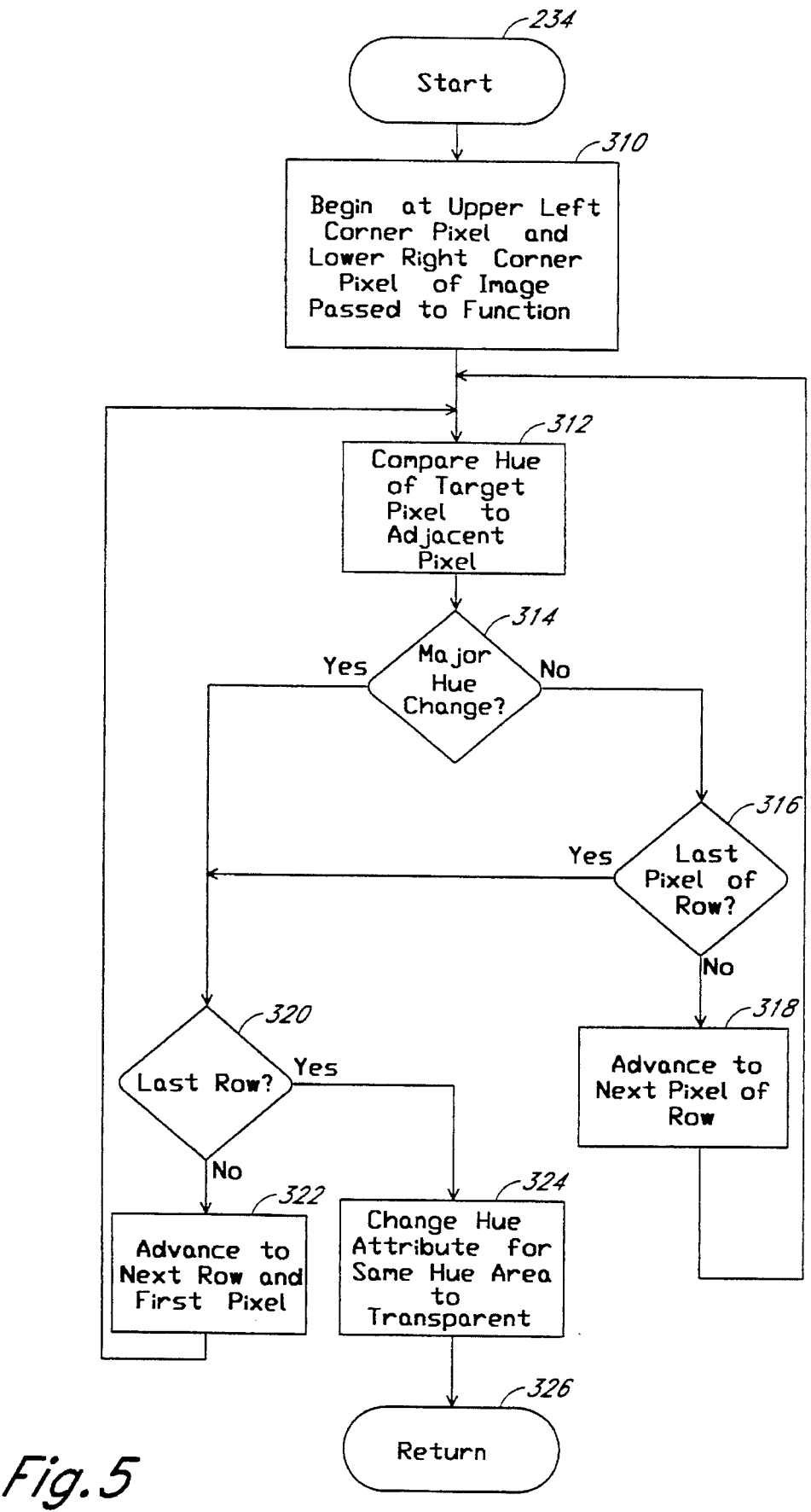
FIG. 5 is a flow diagram of the strip function defined as block 234 in FIG. 3.

Now referring to FIG. 5, the function 234 (FIG. 3c) for stripping portions of an image will be described. The function 234 starts and moves to a step 310 wherein the computer 130 selects the upper left and lower right pixels of the video image 144 passed to the function as shown in FIG. 4b. It is to be understood, however, that the principles of the process described below, which is executed by the computer 130, can be applied when selecting only a single pixel as a starting point or when selecting more than two pixels as simultaneous starting points. For example, as shown at FIG. 4c, the computer 130 could execute the process described below starting at all four corners of the image 144 simultaneously. The process described below can be coded in any suitable computer language, e.g. C.

Accordingly, for disclosure purposes, the process below will be described with reference to use of the upper left pixel of the digitized video image 144 as the starting point. It will be appreciated that the principles of the process will be substantially identical for other starting points, e.g., the lower right pixel of the video image 144, including instances wherein the computer 130 starts at two or more points simultaneously. The control of the parallel processing for multiple processing regions is known to those skilled in the technology.

Step 312 indicates that the computer 130 compares the gamma of the upper left pixel (target pixel) with the gamma of the next pixel in the top row of the video image 144 (FIG. 4b). As is used in the technology, the gamma of a particular pixel is a numeric value that refers to one or more of the particular data attributes which characterize the pixel. For example, some video image pixels have attributes that relate to the hue, intensity, lightness, saturation, and contrast of the portion of the image represented by the pixel. Accordingly, such pixels will have respective numeric "gammas" that represent each one of the above-listed attributes of the particular pixel.

For purposes of the present invention, the gammas that are compared between pixels are the hue gammas of the pixels, although other gammas may be used. In the present embodiment, the hue gamma of each pixel is an integer value from zero (0) to two hundred fifty five (255), with the hue gamma value indicating the hue of the portion of the image represented by the pixel. In the event that the video image is in black-and-white, the hue gamma of a pixel will represent the shade of gray of the pixel, or a gray scale value.

It will accordingly be appreciated that in the case of the continuous hue background 114 (FIG. 4b), adjacent background pixels will have substantially identical hue gamma values, with the particular value depending on the color of the background 114. For example, if the background was defined as 255, e.g., saturated blue, then the background pixels would typically not deviate more than 20 to 40. Thus, the computer 130 assumes that the upper left pixel of the video image 144 is a background pixel, and uses this pixel as a standard pixel. The computer 130 compares its hue gamma with the hue gamma of the immediately adjacent pixel (which can accordingly be considered the test pixel) that is in the same row as the target pixel, to determine whether the immediately adjacent pixel (i.e., test pixel) is also a background pixel. This step is represented at a decision step 314 in FIG. 5.

More specifically, as indicated at decision step 314, the computer 130 compares the difference between the hue gammas of the upper left corner pixel (i.e., the target pixel) and the immediately adjacent pixel (i.e., the test pixel) with a predetermined difference. When the predetermined difference is greater than the difference between the hue gammas of the two pixels, indicating that the test pixel has approximately the same hue as the target pixel and is therefore flagged as a background pixel to be acted upon later, the computer 130 proceeds from step 314 to a decision step 316 in FIG. 5. At step 316, the computer 130 determines whether the test pixel is the last pixel in the row. If there are more pixels in the row, the computer 130 advances to step 318, wherein the computer 130 sets the old test pixel to be the new target pixel, and selects the next pixel in the row as the new test pixel. The computer 130 then continues to step 312 to determine the difference between the hue gamma of the target pixel and the hue gamma of the test pixel, as described above, and compares this difference to the predetermined difference at decision step 314.

On the other hand, when the computer 130 determines that the test pixel is the last pixel in the row at decision step 316, the computer 130 proceeds to a decision step 320 that determines whether the last row of the image 144 (FIG. 4b) has been reached. Stated differently, at decision step 320, the computer 130 determines whether the row which had been under test is the bottom row of the digitized image, if the particular process is that portion of the processing that started at the upper left corner pixel of the digitized image. If, on the other hand, the particular process is that portion of the processing that started at the lower right corner pixel of the digitized image, the computer 130 determines whether the row that had been under test is the top row in the digitized image. If not, the computer 130 proceeds to step 322 wherein the computer 130 sets the target pixel to be the last pixel in the row and the test pixel to be the first pixel in the next immediately lower row. The computer 130 then loops back to step 312 to begin comparing the pixels of the next row. The computer 130 resumes the gamma test comparison described above. Thus, the computer 130 reads and tests the pixels of the background component of the video image 144 (FIG. 4b) in a pixel-by-pixel, row-by-row sequence.

When the computer 130 determines, at decision step 314, that the difference between the target pixel and the pixel under test exceeds the predetermined difference, indicating that the test pixel is not a background pixel and is therefore representative of an edge 146 of the image of the user 112 (FIG. 4c) which has been imaged against the monochrome background 114 (FIG. 1), the computer 130 stores the location of the test pixel in memory. Stated differently, the computer 130 maps the test pixel as a portion of the edge 146. As indicated in FIG. 5, the computer 130 then proceeds to step 320 and resumes processing as described above.

The computer 130 follows the process described above, working simultaneously from the upper left and lower right hand corner pixels, until the computer 130 determines that no more pixels remain to be tested, as indicated by a positive test at decision step 320. At the point wherein no more pixels remain to be tested, the computer 130 moves to step 324, wherein the computer 130 "floods" the background (i.e., turns all pixels that were outside the edge 146 transparent) by setting the hue gamma of the background pixels to zero (0). In other words, the computer 130 removes portions of the image 144 (FIG. 4b) which are represented by pixels that were designated as background pixels 114 in step 314. Alternatively, each background pixel could be turned transparent as soon as the computer 130 determines that the particular pixel is indeed a background pixel. The computer 130 then moves to step 326 and returns to the calling program. At this point in the process, the digitized video image 144 appears as schematically shown at FIG. 4d.

Thus, the computer 130 effectively removes substantially only the portion of the video image 144 that is outside the edge 146 (i.e., the background component of the image), and leaves intact the entire portion of the image 144 that is inside the edge 146 (i.e., the object component of the image). Consequently, portions of the image 144 inside the edge 146 can have the identical hue as the background 114, without being removed from the image 144. Further, no particular, predetermined hue is required to be used as the background hue, in contrast to the chroma-key technology. Instead, any hue may be used as the background hue.

From the disclosure above, it will be appreciated that the predetermined hue gamma difference is selected to be sufficiently large to avoid edge mapping due to a background test pixel that has a hue gamma which is marginally offset from the hue gamma of the target pixel. On the other hand, the predetermined hue gamma difference is selected to be sufficiently small to accurately detect the presence of an object edge pixel, even when the edge pixel has a hue gamma value that is relatively close to the value of the background hue gamma. The precise value of the predetermined hue gamma difference can vary from application to application, depending upon lighting conditions, location, subject matter, etc. In one presently preferred embodiment, the predetermined hue gamma difference is 20.

Figure 6:
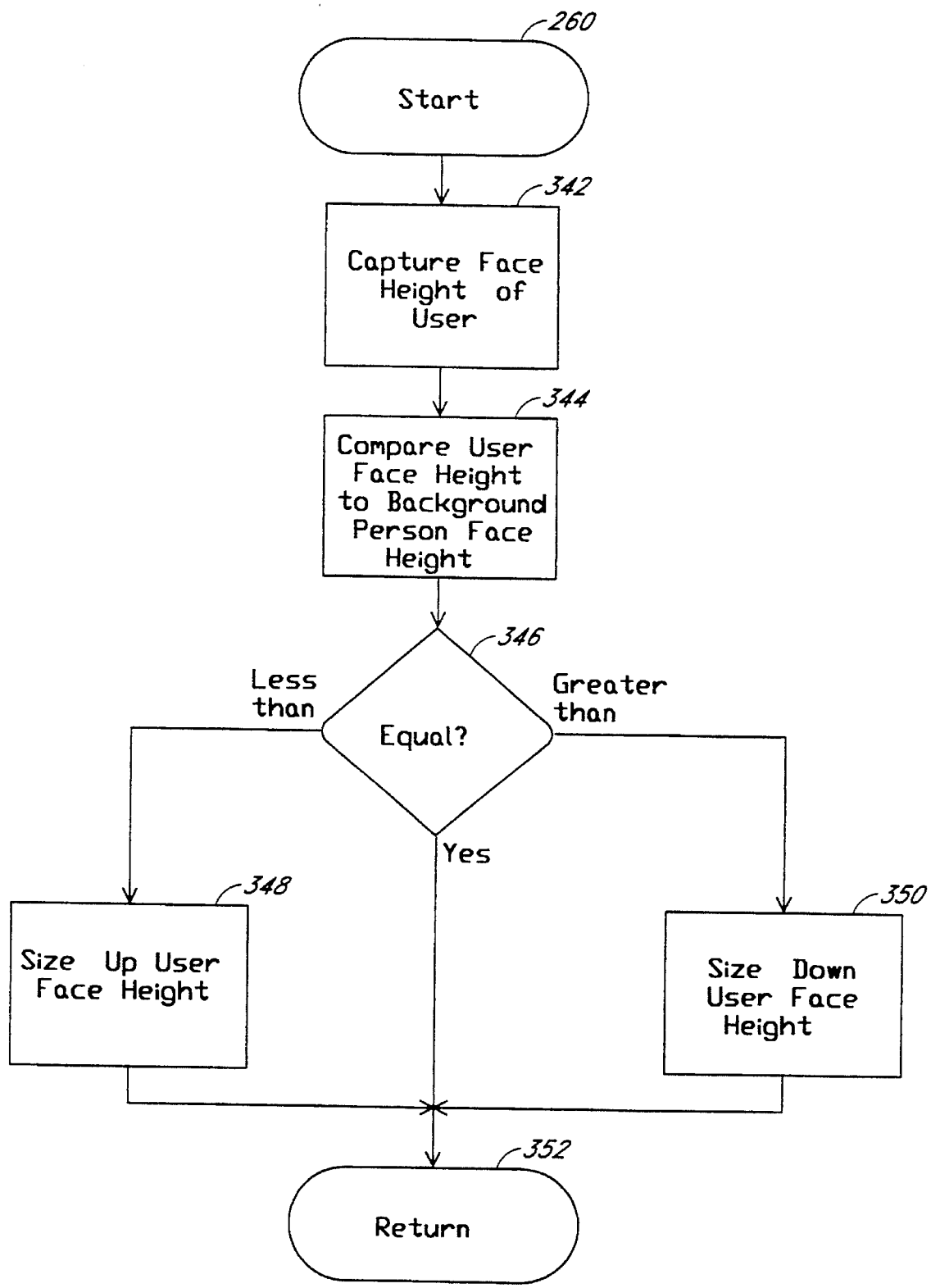
FIG. 6 is a flow diagram of the sizing function defined as block 260 in FIG. 3.

Referring to FIG. 6, the function 260 (FIG. 3) for matching the size of the object to the size of the selected background object will be described. In the preferred embodiment, the object is the head and neck of the user 112, and the selected background object is the head and neck of the background person 145 (FIG. 4e) that will be replaced.

The function 260 starts and moves to a step 342 wherein the computer 130 captures the face height of the user 112. Referring to FIG. 4f, a portion of the background scene chosen by the user at step 236 (FIG. 3c) is shown, including the background person 145 whose face and neck (shown by dashed lines) is to be replaced. A horizontal line 160 is centered over the pupils of the eyes at a coordinate $Y_0$. A cross symbol 162 is centered over the middle of the neck and at the bottom of the chin at a coordinate $Y_1$. A line 164 demarcates the edge of the clothing, e.g., a uniform, from which point downward the user's neck is assigned a lower priority layer than the uniform. Thus, the uniform may be seen to cover part of the user's neck in the final composite image. The face height is the absolute difference between the two coordinates $Y_0$ and $Y_1$. The face height information of the background person, or for each background person in background scenes where a choice of multiple people is given, has been previously calculated and stored in a file header for a file that contains the image of the background scene. The file header format for the presently preferred embodiment is encrypted and is unique to this embodiment. The header is encrypted by XORing with a pseudo-random function. The file header contains RGB information, location of the eyes, location of the chin (cross symbol), the face height, and so on to define the characteristics of the face or object in the file image.

Referring to FIG. 4g, an image of the user's face and neck is shown. A horizontal line 170 is centered over the pupils of the eyes at a coordinate $Y_0'$. A cross symbol 172 is centered over the middle of the neck and at the bottom of the chin at a coordinate $Y_1'$. The user's face height is the absolute difference between the two coordinates $Y_0'$ and $Y_1'$. The user's face height information is stored in a file header for a file that contains the image of the user's head and neck.

Now returning to FIG. 6, after the completion of step 342, the computer advances to step 344. At step 344, the computer 130 compares the user's face height captured at step 342 to the face height of the background person at the location chosen by the user at step 236 (FIG. 3c). If, at a decision step 346, the face height of the user is less, e.g., the user 112 is a child, the computer moves to a step 348. At step 348, the computer 130 will proportionately size up the image of the user's face and neck until the face height of the user equals the face height of the background person, and then returns at step 352. If, at a decision step 346, the face height of the user 112 is greater than that of the background person, the computer 130 moves to a step 350. At step 350, the computer 130 will proportionately size down or up the image of the user's face and neck, until the face height of the user equals the face height of the background person, and then returns at step 352. However if, at a decision step 346, the face height of the user 112 is equal to that of the background person, the computer 130 returns at step 352 to the calling main flow 200 (FIG. 3).

Figure 7:
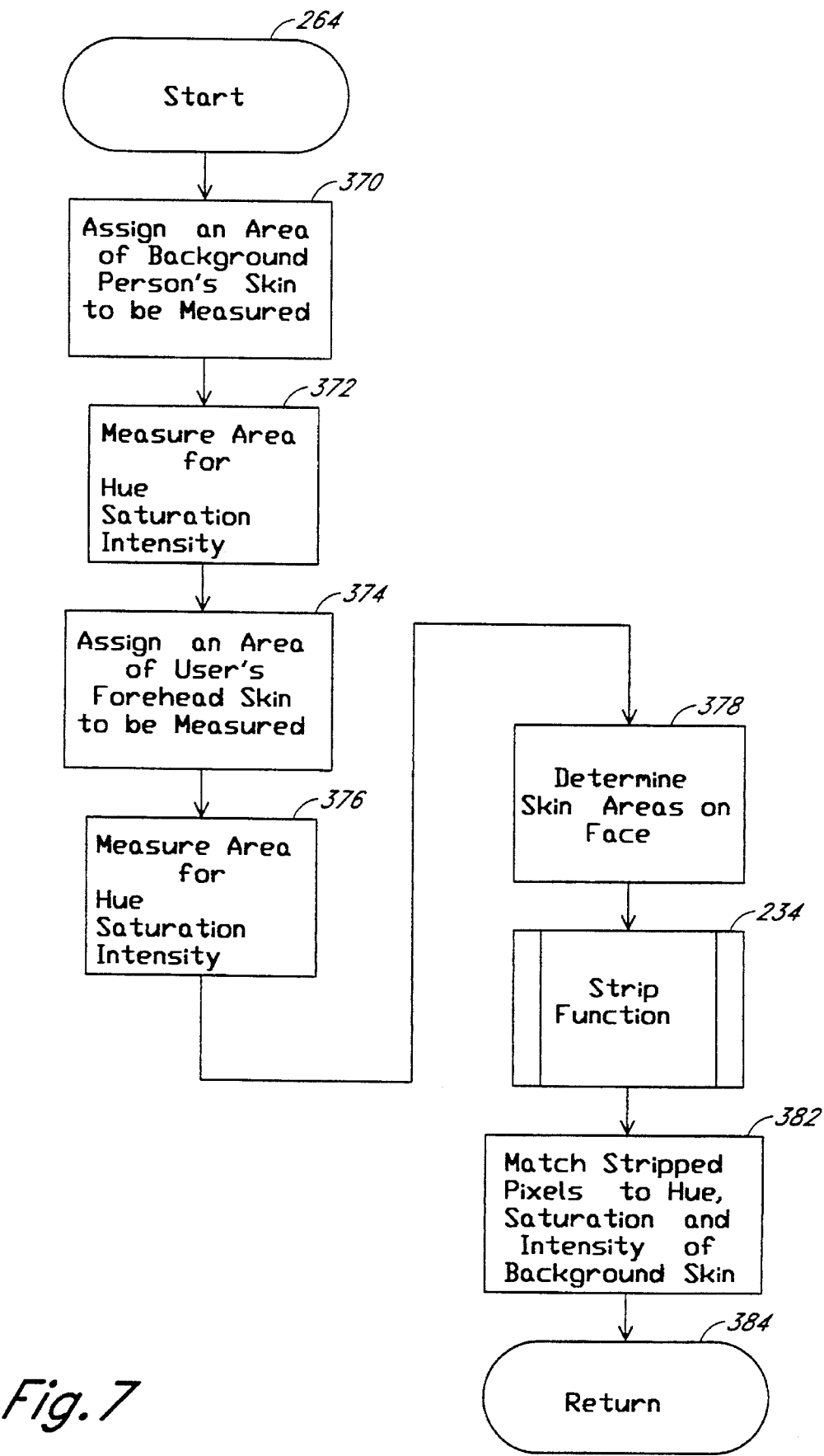
FIG. 7 is a flow diagram of the skin match function defined as block 264 in FIG. 3.

Referring to FIG. 7, the function 264 (FIG. 3d) for matching the object or user person's skin to the skin of the selected background person 145 (FIG. 4e) will be described. The function 264 starts and proceeds to a step 370 wherein an area of the background person, that is to be replaced in the composite image, is assigned to be measured. Moving to step 372, the computer 130 measures three gamma attributes in the assigned area: overall hue, overall saturation, and overall intensity. Next, at step 374, the computer 130 assigns an area of the user's skin to be measured. The computer 130 knows where the eyes of the user 112 are on the image shown in FIG. 4g because of the line 170. The computer assigns the area on the forehead of the image of the user 112 just above the eyes. This area is then measured at step 376 for the same attributes: hue, saturation, and intensity. Proceeding to step 378, the computer 130 then determines the skin areas of the image of the user's face by using the attributes measured at step 376, which describe the user's skin, to be compared against upon calling the strip function 234. The function 234, in this call, will flag the skin pixels of the image of the user's face. The hair, eyebrows, eyes, lips, beard and/or mustache (if present), and so forth will not be flagged. Then, upon return from the function 234, the computer 130 proceeds to step 382. At step 382, the flagged skin pixels identified by the function 234 are set to the values of the attributes measured at step 372 of the background person's skin, and then the function 264 returns at step 384 to the calling main flow 200 (FIG. 3).

Figure 8:
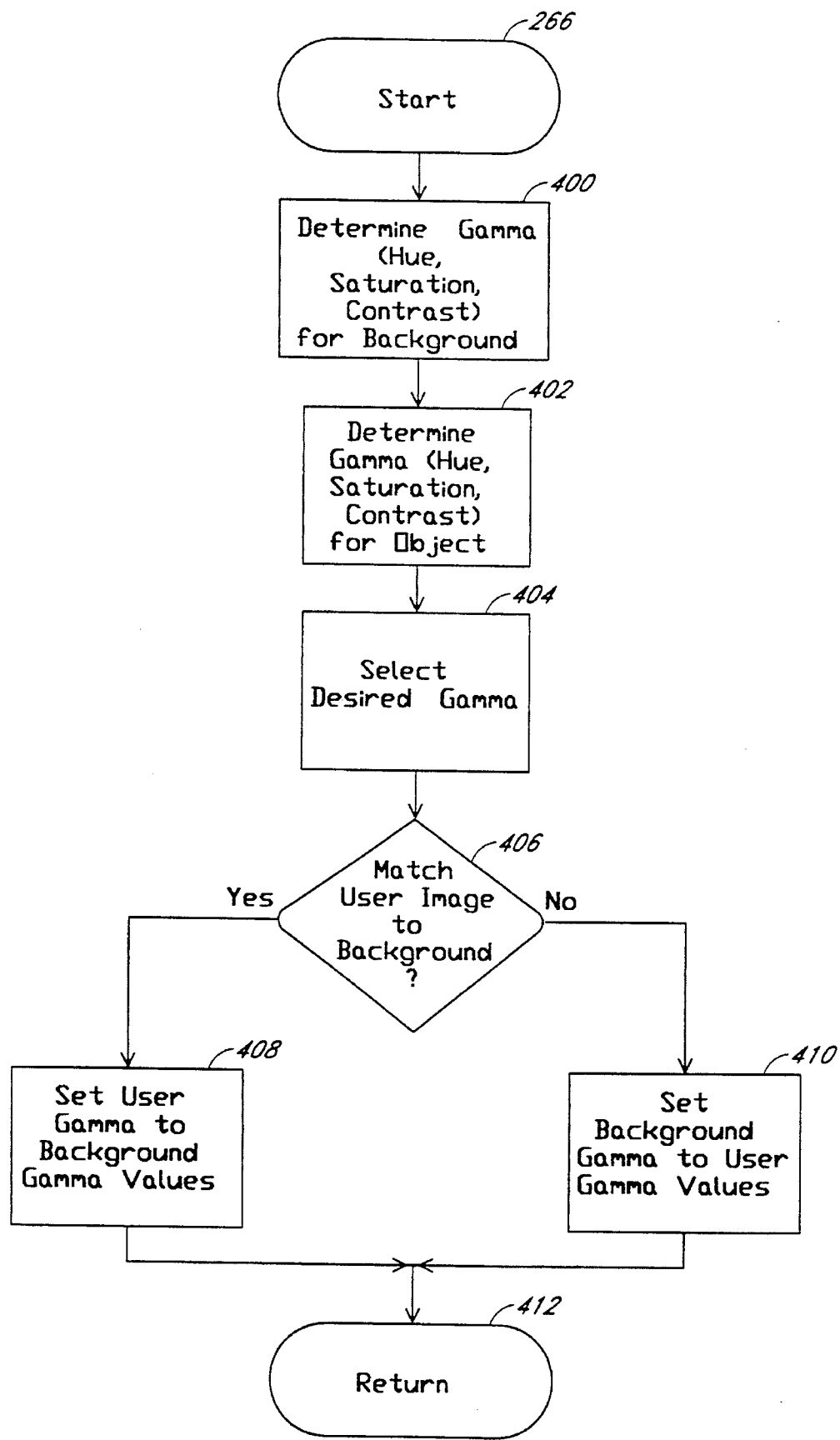
FIG. 8 is a flow diagram of the background gamma function defined as block 266 in FIG. 3.

Referring to FIG. 8, the function 266 (FIG. 3d) for matching the object or user gamma to the gamma of the selected background scene (FIG. 4e) will be described. The function 266 can make it appear as though the object were imaged under the same lighting conditions as the background into which the object will be digitally layered. The function 266 starts and proceeds to a step 400 wherein the computer 130 determines the type of lighting used for the background scene (FIG. 4e). The lighting conditions are determined by measuring the gamma attributes of hue, saturation, and contrast at a software determined area of the background scene. Moving to step 402, the computer 130 measures the same gamma attributes as at step 400, but for the user image 144 (FIG. 4d).

Next, the computer 130 proceeds to step 404 wherein the computer 130 chooses which lighting condition is desired. In other words, the computer 130 at step 404 determines whether the hue gamma of the object will be changed to match the hue gamma of the background or whether the hue gamma of the background will be changed to match the hue gamma of the object. This determination by the computer 130 can be accomplished in response to an interactive command by the user of the system 100, i.e., the user of the system 100 can decide whether he wishes to change the lighting condition of the background scene to match the lighting conditions under which he was imaged, or whether he wishes to change the apparent lighting conditions under which he was imaged to match the lighting conditions of the background scene. Furthermore, the apparent lighting conditions of the object and background scene can both be changed to match a third lighting condition if desired (this choice is not shown in FIG. 8).

From step 404, the computer 130 proceeds to a decision step 406 wherein the computer 130 determines whether the object gamma is to be changed. If so, the computer 130 proceeds to step 408 wherein the computer 130 sets the gamma attribute values for hue, saturation, and contrast of the object to equal the background scene gamma attribute values for hue, saturation, and contrast. Otherwise, the computer 130 proceeds to step 410 wherein the computer 130 sets the gamma of the background scene to equal the gamma values of the object. Upon completion of either step 408 or step 410, the computer 130 proceeds to step 412 and returns to the main calling flow 200.

Figure 9:
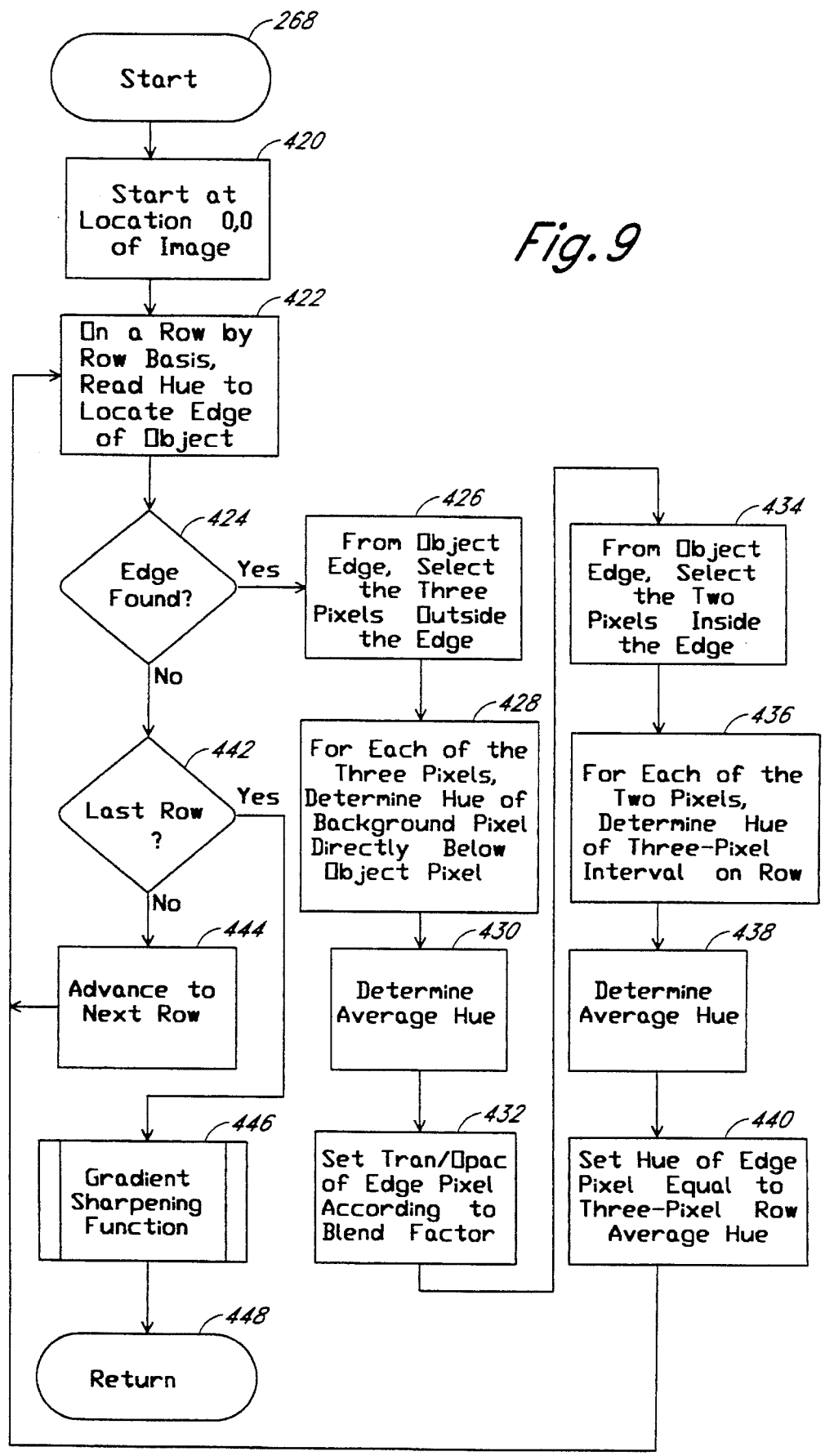
FIG. 9 is a flow diagram of the pixel enhancement function defined as block 268 in FIG. 3.

Referring to FIG. 9, the function 268 for enhancing the pixels of an image will be described. The function 268 is called by either the main flow 200 (FIG. 3d) or the top-level gamma function 262 (FIG. 12). The function 268 starts and proceeds to a step 420 wherein the computer 130 begins processing the image at a predetermined location, e.g., X,Y coordinates 0,0. Moving to step 422, the computer 130 determines the hue value of each pixel on the current row to attempt to locate an edge of the object in that row. If an edge is found, as determined by a decision step 424, the computer 130 proceeds to a step 426. The edge is located if the computer 130 determines that the hue of the pixel has a major change compared to the previous pixel. In the preferred embodiment, such a change would be found if the value of hue changed by an amount of 80 or more, where the full range of hue values runs from 0 to 255. Of course, the change threshold could be any value within the above-indicated range, as selected for the particular application of the system.

At step 426, the computer 130 selects the three pixels just outside the edge of the object and uses them as edge pixels in performing a blend operation. The blend operation is performed by the computer 130 in steps 428, 430, and 432 wherein the aforementioned three pixels are blended to the background layer directly below the current object layer. At step 428, for each of the three pixels, the computer 130 determines the hue of the background pixel in the layer beneath the object pixel and then averages the hue value of each of the three background pixels with the corresponding object pixel at step 430. Moving to step 432, the computer 130 sets the transparency or opacity of each of the three object layer edge pixels according to a blend factor that is found in the file header. The blend factor, having a value from zero (opaque) to 127 (transparent), is used for dynamic variable transparency of the object, and is selected from within this range of values by the programmer using trial and error in view of what the results are desired to be. Upon completion of step 432, the computer moves to a step 434, wherein the computer 130 uses the edge found on the current row, as determined at step 422, and selects the two pixels inside the object edge for a fuzz operation. The fuzz operation is performed by the computer 130 in steps 436, 438, and 440 wherein the edge of the object is smoothed. At step 436, for each of the two aforementioned pixels, the computer 130 determines the hue of the three pixels immediately adjacent them on the same row. Then, as indicated at step 438, the computer 130 determines the average hue value of the three-pixel interval. Moving to step 440, the computer 130 sets the hue value of each of the two aforementioned pixels equal to the average determined in the previous step 438.

Upon completion of step 440, the computer loops back to step 422 to attempt to locate another edge in the current row. If another edge is found, as determined at the decision step 424, the previously described process is performed. However, if the end of the current row is reached without locating an edge, the computer 130 moves to a decision step 442 to determine whether the last row of the image has just been processed. If not, the computer 130 proceeds to step 444 and selects the next row for processing and then loops back to step 422 to locate an edge. However, if the last row has been processed, as determined by decision step 442, the computer calls a gradient sharpening function 446 to enhance the object edges.

The file header has predetermined values for the amount of sharpening to be done. For example, the image could have no sharpening done on the edges but full sharpening done at the center, 100% with a linear scale in between the center and borders. Other percentages can be used as a sharpening factor. For example, the image can have 30% sharpening at left edge, 20% at center and 80% at right edge with a linear scale in between the center and borders. The function 446 will be described hereinbelow. After the function 446 has returned back to the function 268, the computer 130 exits the pixel enhancement function 268 at a step 448.

Figure 10:
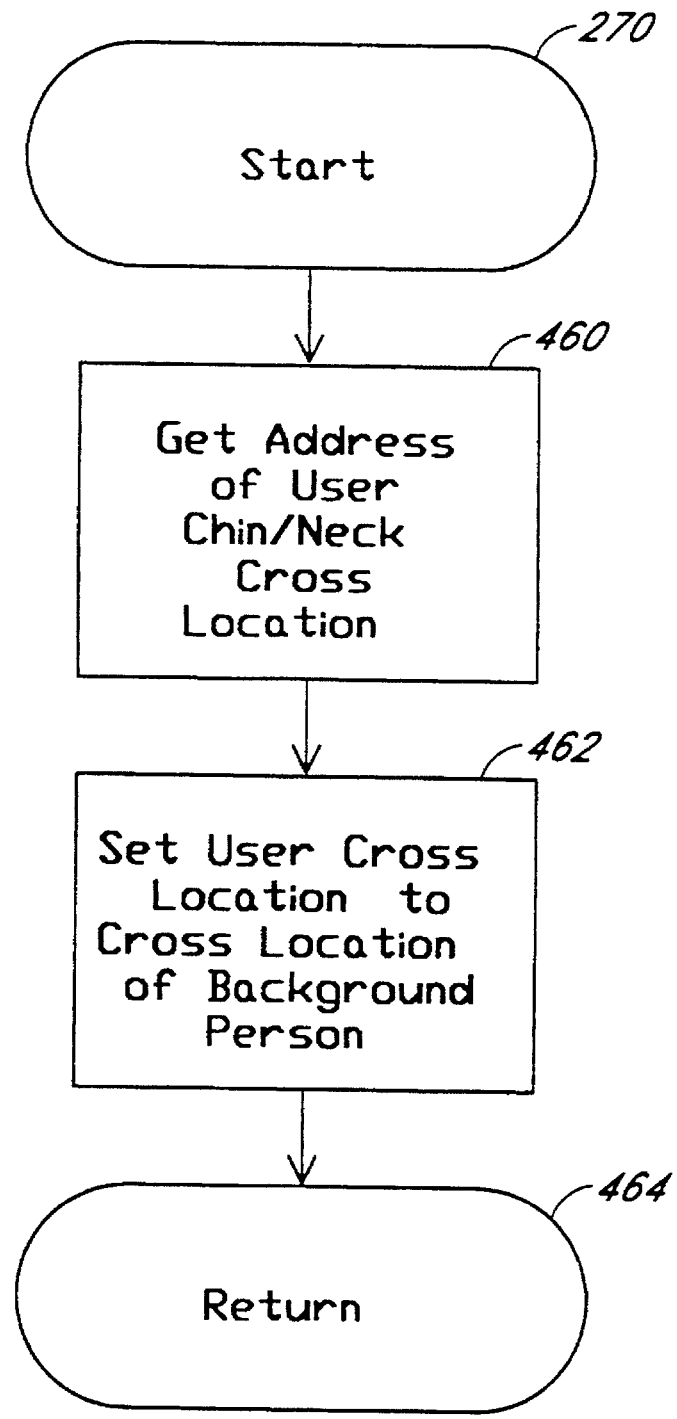
FIG. 10 is a flow diagram of the position function defined as block 270 in FIG. 3.

The details of the process carried out by the computer 130 at function 270 of FIG. 3d are more fully understood in reference to FIG. 10. The function 270 for positioning the object or user 112 into the selected background scene (FIG. 4e) will be described. The function 270 starts and proceeds to a step 460 wherein the computer 130 gets the address of the cross symbol 172 (FIG. 4g) on the user image. This symbol is at the middle of the neck and bottom of the chin on the user image as placed by the user 112 at step 258 of FIG. 3d. The address of the cross symbol 172 is retrieved from the file header of the user image file. The computer 130 then proceeds to step 462 and retrieves the address of the cross symbol 162 (FIG. 4f) for the selected person 145 of the background scene. This address is retrieved from the file header of the background scene image file. The computer then sets the address of the user's cross symbol 172 equivalent to the address of the cross symbol 162 of the selected person 145 in the background scene. Therefore, when the composite image is layered together, the image of the user 112 will be at the correct location. The computer 130 returns at step 464 to the calling main flow 200 (FIG. 3).

Figure 11:
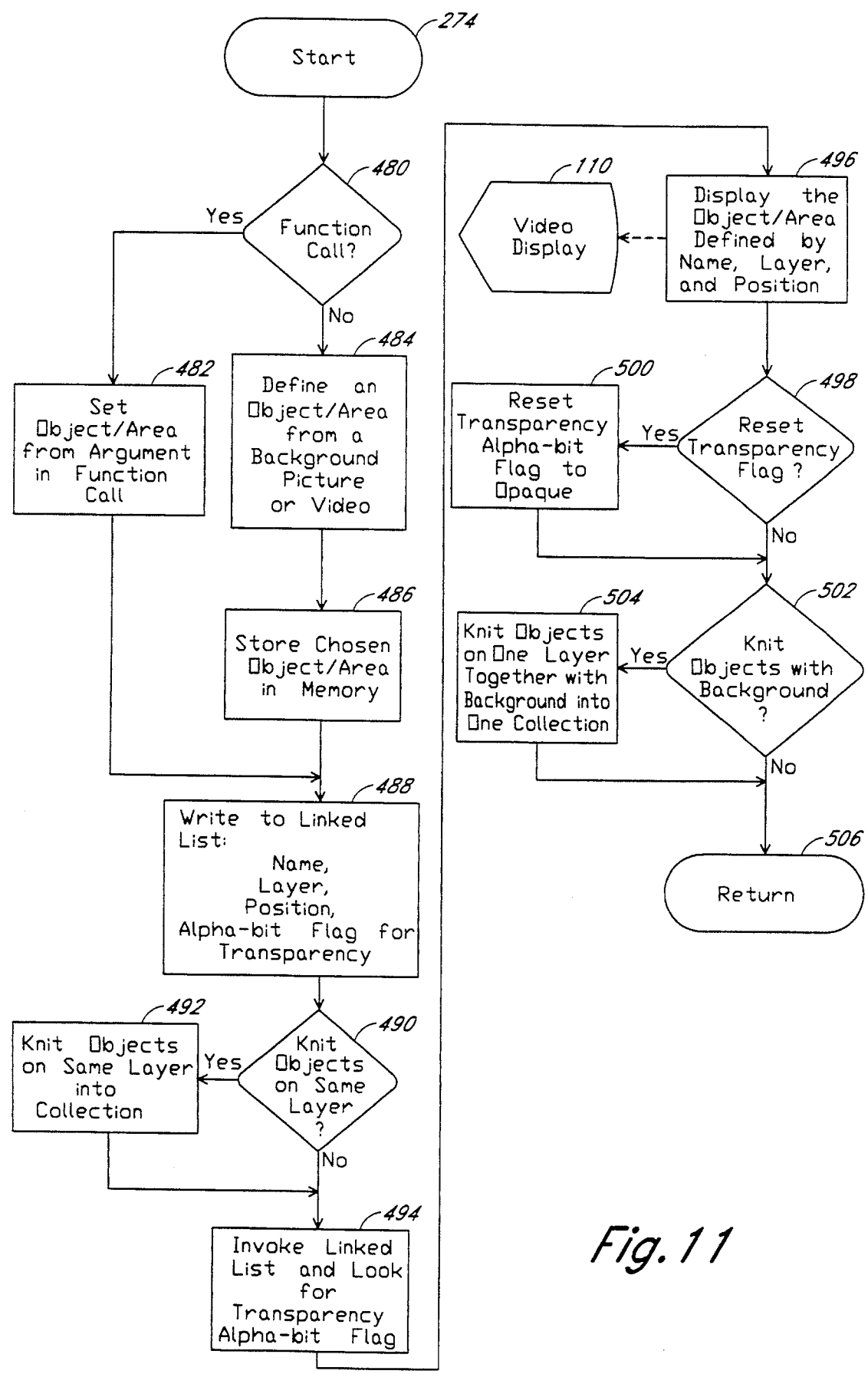
FIG. 11 is a flow diagram of the layering function defined as block 274 in FIG. 3.

The details of the process carried out by the computer 130 at function 274 of FIG. 3c are more fully understood in reference to FIG. 11. The function 274 for layering an object or personalization text into the selected background scene (FIG. 4e) will be described. The function 274 is called twice by the main control flow 200. The first call in the preferred embodiment is to layer the image of the user's head and neck, such that user image will result being slid down, for example, a jersey or uniform, in the final composite image. The jersey has a higher priority than the user image, such that the user's neck and head become visible at the top of the jersey. Both the jersey and the user image have a higher priority than the background scene.

The second call in the preferred embodiment is to layer the personalization text which the user has entered at step 244 (FIG. 3c). The text has the highest priority and, therefore, will always be visible in the final composite image.

The function 274 starts and proceeds to a decision step 480 wherein a determination is made whether this routine is a function call, as in the preferred embodiment, or is a user call, for an alternate embodiment. In the preferred embodiment, the computer 130 proceeds to step 482 wherein the item, e.g., text or an object, or the area of an image to be layered is identified in the argument for the function call. The computer 130 then accesses the information corresponding to the item or area and proceeds to step 488. If however, at step 480, the call to this routine is a user call, the computer 130 proceeds to a step 484. At step 484, an area or object in the background scene can be defined by the user 112 to be moved to another layer. At step 486, the selected area or object is stored to memory along with information for name, layer, position within the layer, and alpha-bit flag used to set transparency bits.

Upon completion of either step 486 or 482, the name, layer, position within the layer, and alpha-bit flag, all corresponding to the item or area, are written to a linked list by the computer 130 at step 488. The alpha-bit flag denotes transparency or opacity of the item or area. The position is stored in X,Y coordinates. After completion of step 488, the computer 130 moves to a decision step 490 and checks to see if an option is invoked, in an alternate embodiment, to stitch, or link together, multiple objects on the same layer. If so, at option step 492, the computer stitches the objects desired on the same layer together into a layer collection. After completion of option step 492 or if the decision step 490 is false, the computer 130 moves to step 494. At step 494, the computer 130 invokes the linked list and looks for the transparency alpha-bit flags. At step 496, for the item pointed to by the linked list, the computer 130 displays the object or area defined by name, layer, and position within the layer on the monitor 110 (FIG. 2).

In an alternate embodiment, a check is made at an option decision step 498 to determine if the user 112 (FIG. 1) desires to reset the transparency alpha-bit flag. If so, the computer moves to option step 500 wherein the transparency flag is reset to opaque by use of a pointing tool, e.g. a mouse, or by area definition using X,Y cartesian coordinates. Upon completion of step option 500 or if the decision step 498 is false, the computer 130 moves to an option decision step 502. In an alternate embodiment, step 502 determines if the user 112 wants to stitch an object or objects on one layer together with the background. If so, at option step 504, the computer 130 stitches the objects on one layer together with the background into one collection and then the objects are removed from the linked list. The collection may include objects, an area, backgrounds, text, and so forth. In the presently preferred embodiment, a file format for storing the background, or the collection as a new background, has a file extension ".spo". At the completion of option step 504 or if decision step 502 is false, the computer 130 returns at step 506 to the calling main flow 200 (FIG. 3).

Figure 12B:
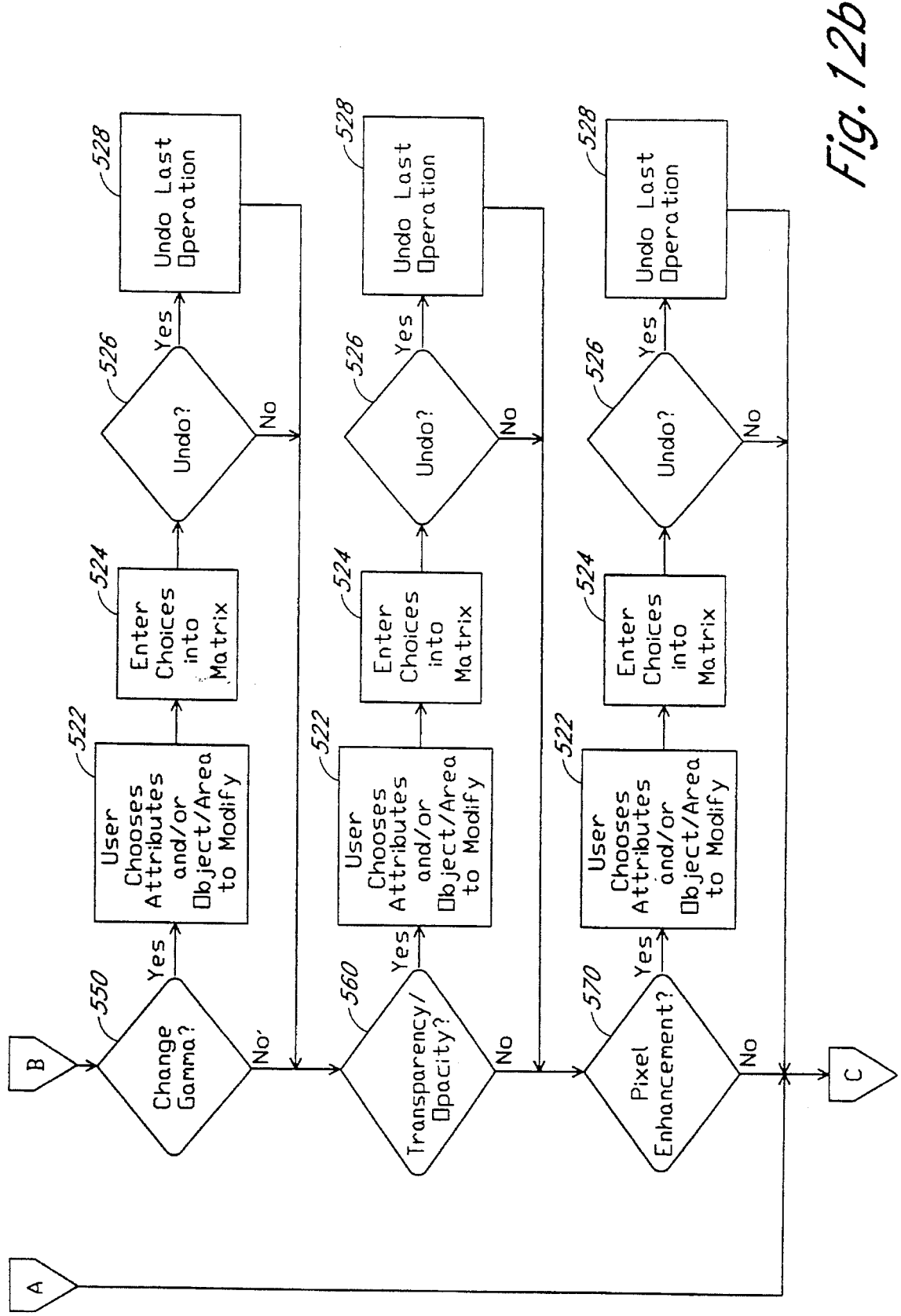
Figure 12C:
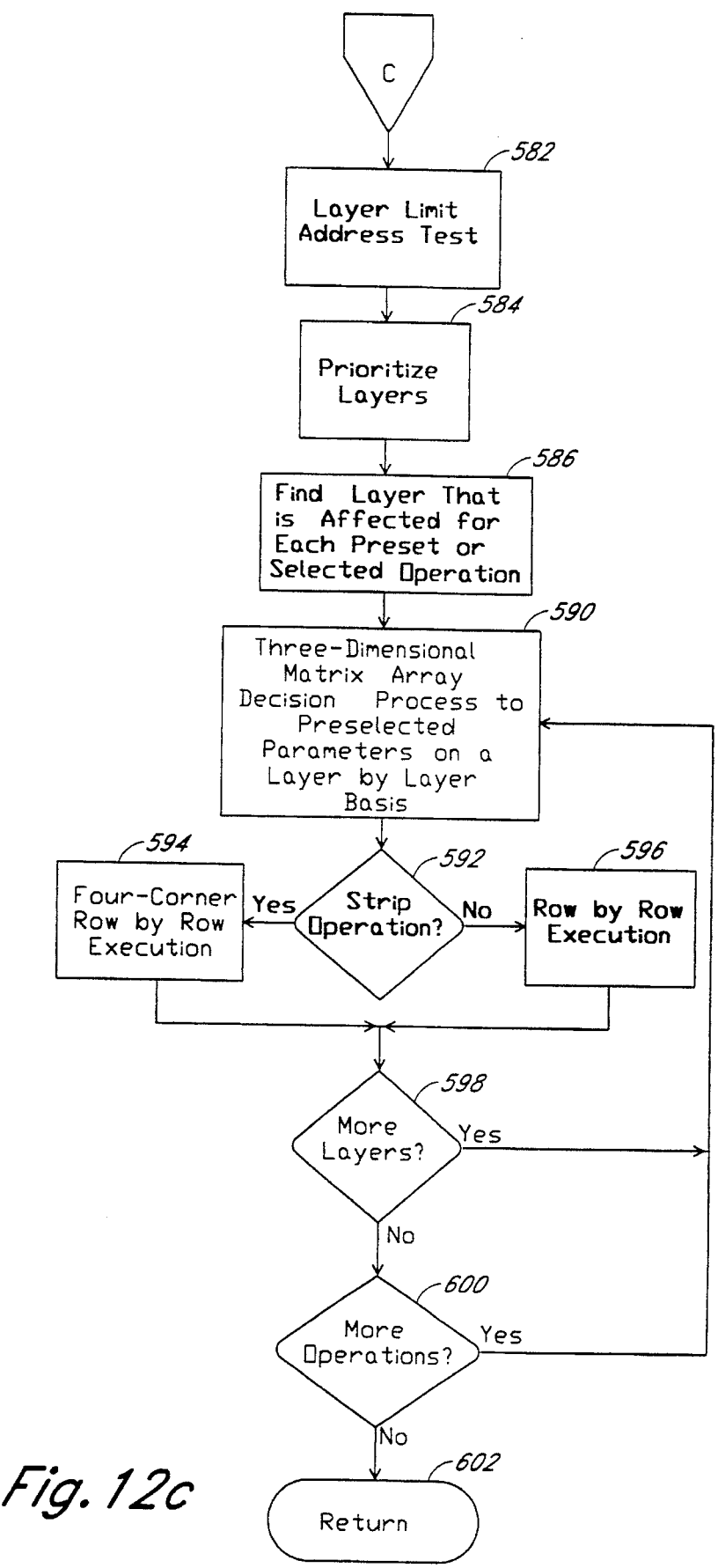

Referring to FIG. 12a, 12b and 12c, the top-level gamma function 262 (FIG. 3d) will now be described. Although the preferred embodiment disclosed herein does not include the top-level gamma function 262, an alternate embodiment may include this function. The function 262 may be utilized in two ways: as a function call, wherein attributes to be changed are preselected, or as a user call, wherein attributes to be changed are selected by the user 112. When function 262 is accessed by a user call, the system 100 operates as a highly interactive and very powerful image editing tool.

The function 262 starts and moves to a decision step 514 to determine if the routine 262 is called as function. If so, the computer 130 proceeds to a step 516 to access preset gamma attributes, layer, and object or area selections, e.g., all pixels on layer one with a hue of blue at a value range of 10 to 75. The computer 130 then moves from step 516 and proceeds through the off-page connector A and resumes again at step 582 on FIG. 12c. However, if the routine 262 is a user call as determined at step 514, the computer 130 proceeds to a decision step 520 wherein the computer 130 checks to determine if a strip operation is to be done. The strip operation in this function may be done on an object or on the background scene. If so, the computer 130 proceeds to step 522 wherein the user 112 selects the gamma attributes, with corresponding values, and/or a layer and an object or an area on the layer to be changed. At the completion of step 522, the computer 130 proceeds to step 524 and enters the selections from step 522 into a matrix. At a decision step 526, the computer 130 checks to see whether the user 112 wants to undo the operation selected at step 520. If so, at step 528, the computer 130 will negate the operation selected at step 520.

The x-axis of the matrix mentioned above includes the gamma attributes: hue (H), saturation (S), lightness (L), intensity (I), contrast (C), red (R), green (G), blue (B), and the combinations HSL, HSI, HSC and RGB. The y-axis of the matrix includes the operations done by the top-level gamma function: strip, fuzz, blend, change gamma, transparency/opacity, and pixel enhancement. Associated with the matrix is a z-axis that corresponds to the layer number of a composite image. In the presently preferred embodiment, the z-axis utilizes 32 layers. The matrix permits one or multiple operations on one or multiple gamma attributes to be performed on one or multiple layers of the composite image in any combination.

After completion of step 528, or if decision step 526 result is false, or if the decision step 520 result is false, i.e., strip was not selected, the computer 130 proceeds to a decision step 530 wherein a check is made to determine if a fuzz operation is to be done. The fuzz operation may be done on an object or on the background scene. If so, the computer moves to a set of steps essentially the same as steps 522 through 528 as described above and then proceeds to a decision step 540. If the check to determine if the operation is to be done at step 530 (and steps 540, 550, and 560 below) is false, the computer 130 continues to the next decision step to test for the next possible operation.

At step 540, the computer 130 checks to determine if a blend operation is to be done. The blend operation in this function may be done on the background scene or on an object on the adjacent layer. If so, the computer moves to a set of steps essentially the same as steps 522 through 528 as described above and then proceeds to a decision step 550 on FIG. 12b through off page connector B.

At step 550, the computer 130 checks to determine if a gamma change operation is to be done. The gamma operation in this function may be done on an object and/or the background scene. If so, the computer moves to a set of steps essentially the same as steps 522 through 528 as described above and then proceeds to a decision step 560.

At step 560, the computer 130 checks to determine if a transparency/opacity operation is to be done. The transparency/opacity operation in this function may be done on the background scene or on an object on the adjacent layer. If so, the computer moves to a set of steps essentially the same as steps 522 through 528 as described above and then proceeds to a decision step 570.

At step 570, the computer 130 checks to determine if a pixel enhancement operation is to be done. The pixel enhancement operation in this function may be done on an object and/or the background scene. If so, the computer moves to a set of steps essentially the same as steps 522 through 528 as described above and then proceeds to step 582 via the off-page connector C to FIG. 12c. If the pixel enhancement operation was not selected at step 570, the computer 130 also proceeds to step 582 via the off-page connector C.

The next three steps (582, 584, 586 of FIG. 12c) of function 262 are recursively performed by the computer 130 for each preset (from step 516) or selected operation (from steps 520 to 570) in preparation for step 590. At step 582, the computer 130 performs a layer limit address test. In the presently preferred embodiment there are 32 layers. The computer 130 tests to see if it is at the top layer (Z=31) or at the bottom layer (Z=0). Moving to step 584, the computer 130 prioritizes the layers and operations. The first operation that is prioritized is transparency/opacity. Layer zero (Z=0) is the original background scene. As an example, for an area on layer zero to be opaque, nothing in the same area on the 31 layers above layer zero can be opaque, so therefore that area would be set transparent in each of the 31 layers. As another example, if layer seven (Z=7) is made semi-transparent, then all the layers above layer seven (Z=8 to 31) must be transparent, and the layers below (Z=0 to 6) layer seven are adjusted in transparency/opacity to account for the semi-transparency of layer seven. In another example, the top layer (Z=31) is made opaque, so nothing needs to be changed on the other 31 layers. The other preset or selected operations are then also prioritized. At step 586, the computer 130 looks for the layer that is affected for each preset or selected operation. There could be six different layers corresponding to the six operations from steps 520 to 570 in the priority list. The steps 582 through 586 are recursively performed until the layer limit address test is satisfied for each operation.

At step 590, the computer 130 goes through a process to schedule the execution of the operations selected in steps 520 through 570, or from step 516, as described above, on a layer by layer basis. At a decision step 592, the computer 130 checks to see if the operation scheduled for execution is the strip operation. If so, at step 594, the computer 130 performs the strip on a layer (chosen for execution by step 590) using the method that starts at the four corners of the layer and advances through the rows, as previously described in conjunction with function 234. If the test at step 592 is false (not strip), one operation, e.g., fuzz, as scheduled by the computer 130, is executed on a layer (chosen for execution by step 590) using the row by row method of execution. After all the rows of a layer have been processed at step 596, the computer 130 advances to a decision step 598 and checks whether more layers are to be processed. If so, the computer 130 loops back to step 590 to schedule the next selected layer with the same operation as previously executed, e.g., fuzz. One operation is done on all desired layers before moving to a decision step 600 wherein a check is made to determine if additional operations are to done. If so, the computer 130 loops back to step 590 wherein the next selected new operation, e.g., blend, is scheduled to be executed. If all operations are complete at step 600, the computer returns at step 602 to the calling main flow 200 (FIG. 3).

The top-level gamma function 262 can be used to create interesting composite images. As an example, the user desires the image of his head to replace the image of the head of a hockey player on a hockey playing card. The hockey player has a big scar on his face which the user wants to have on the image of his face in the resultant composite image. Using the top-level gamma function 262, the image of the scar can be isolated and made opaque. The rest of the image of the hockey player's head is made transparent. The image of the user's head is made opaque except for the area where the scar is, which is made transparent. In the resultant composite image playing card, the scar appears on the image of the user's head which is on the image of the hockey player's body.

Four functions execute the operations as selected by steps 530, 540, 550 or 560 of the top-level gamma function 262 (FIG. 12). The actual scheduling and call for execution of these functions is carried out by steps 590 and 596. However, for sake of reference, the operation selected by step 530 is referred to as a fuzz function 530', the operation selected by step 540 is referred to as a blend function 540', the operation selected by step 550 is referred to as a change gamma function 550', and the operation selected by step 560 is referred to as a transparency/opacity function 560'. These four functions will be described hereinbelow. The operation selected by step 520 is performed by the strip function 234 as described in conjunction with FIG. 5. The operation selected by step 570 is performed by the pixel enhancement function 268 as described in conjunction with FIG. 9.

Figure 13:
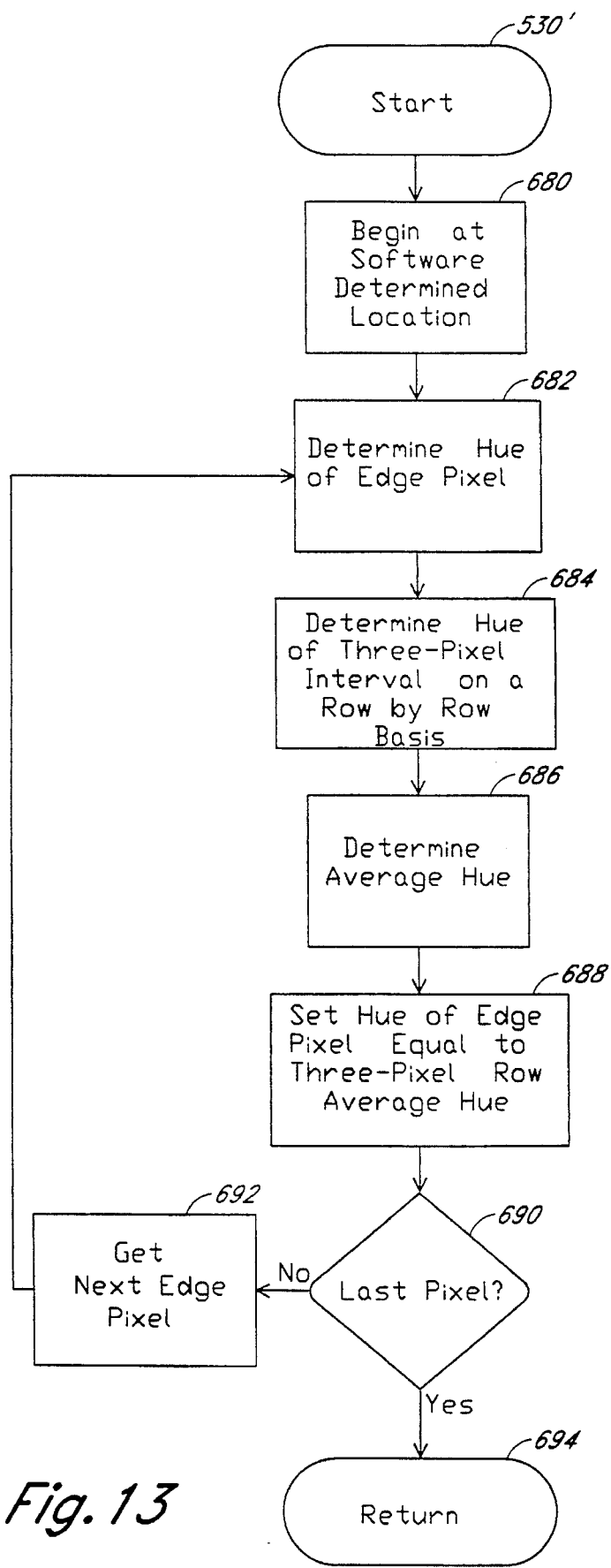
FIG. 13 is a flow diagram of the fuzz function corresponding with block 530 in FIG. 12.

After the background component 114 of the digital image 144 (FIG. 4b) has effectively been removed, the component representing the image of the user 112 remains (FIG. 4d), and has a relatively "fuzzy" edge, characterized by a pixel width of about one or two pixels. Accordingly, to produce a digital image having a smooth edge the digital computer 130 executes the fuzz function 530' as shown in FIG. 13. The fuzz function 530' may be called by either the pixel enhancement function 268 (FIG. 9) or the top-level gamma function 262 (FIG. 12). The function starts at a step 530' and proceeds to a step 680 wherein the computer 130 selects one of the edge pixels (i.e., a "test" pixel) by using a software determined address (e.g., by selecting the uppermost left pixel) and determines its hue at step 682. Next, as indicated at step 684, the computer 130 selects the edge pixels which are immediately adjacent the test pixel for a three-pixel interval on one row and determines the hue of these pixels.

Then, as indicated at step 686, the computer 130 determines the average hue gamma value of the three pixels. As indicated at step 688, the computer 130 then sets the hue gamma value of the test pixel to be equal to the average value calculated in step 686. The computer 130 proceeds to a decision step 690, wherein the computer 130 determines whether the test pixel is the last edge pixel to be processed in the fuzz function 530'. If not, the computer 130 proceeds to step 692, wherein the computer 130 selects one of the edge pixels that is immediately adjacent the test pixel, designates this adjacent pixel as the new test pixel, and loops back to step 682. If, at step 690, the computer 130 determined that the test pixel was the last edge pixel, the computer 130 exits the fuzz function 530' at a step 694.

Figure 14:
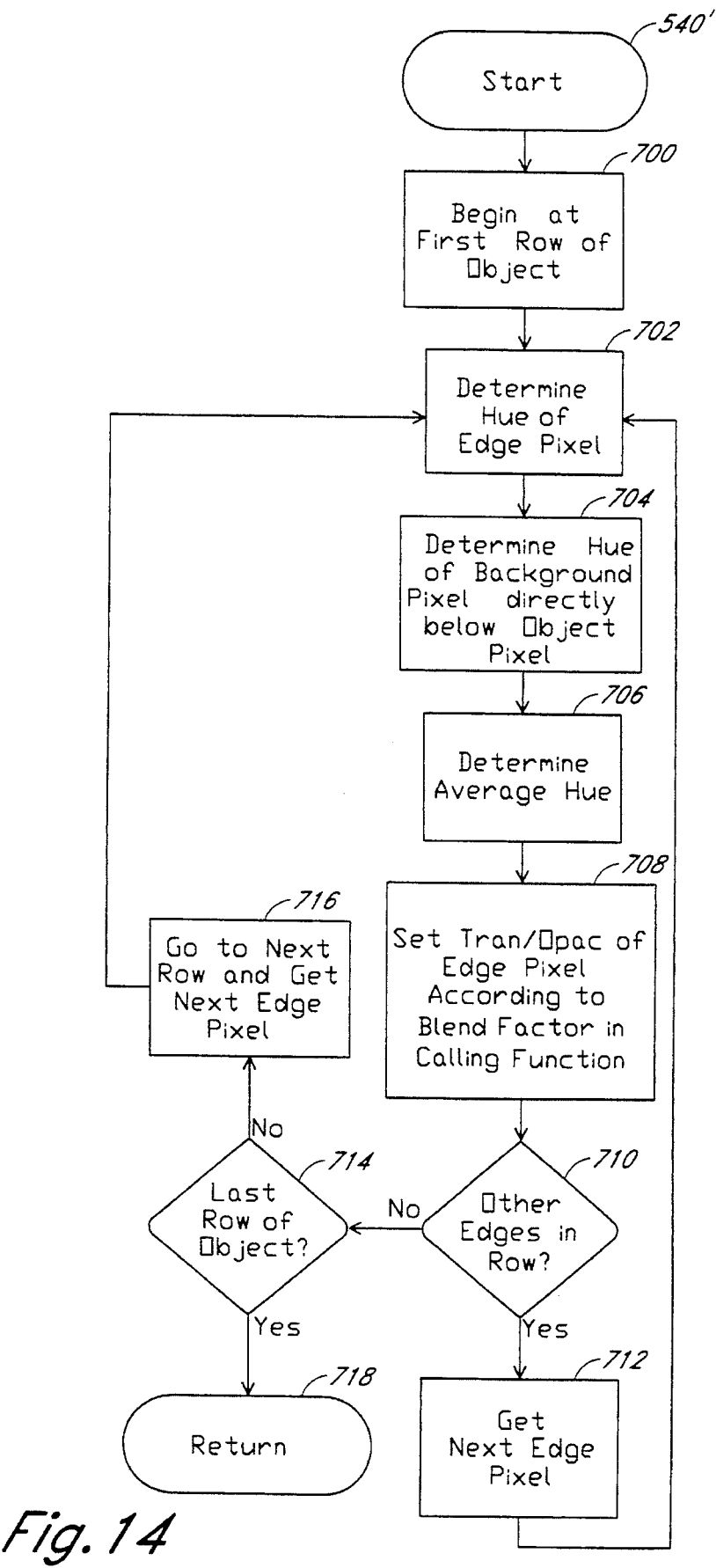
FIG. 14 is a flow diagram of the blend function corresponding with block 540 in FIG. 12.

The computer 130 blends the surrounding background to the edges of an object or an area on the layer adjacent to background scene layer in function 540'. The blend function 540' is more fully understood by reference to FIG. 14. The blend function 540' may be called by either the pixel enhancement function 268 (FIG. 9) or the top-level gamma function 262 (FIG. 12). The computer 130 starts at step 540' and proceeds to step 700 wherein the computer 130 selects an object edge pixel as the test pixel. The selection of the object edge pixel is made at a software determined address, e.g., the left edge pixel of the first row of the object. Moving to step 702, the computer 130 determines the hue gamma value of the test pixel. From step 702, the computer 130 proceeds to step 704 and determines the hue of the background pixel that is on the layer immediately below the selected test pixel in the same row as the test pixel. Then the computer 130 proceeds to step 706 wherein the computer 130 determines the average hue of the two pixels. From step 706, the computer 130 proceeds to step 708, wherein the computer 130 sets the transparency/opacity of the test pixel according to the blend factor in the calling function.

From step 708, the computer 130 proceeds to a decision step 710, wherein the computer 130 determines whether there are other edges in the current row; that is, whether the test pixel is the last edge pixel to be processed in the current row. If there is at least one additional edge in the current row, the computer moves to step 712 and selects the next edge pixel. This pixel is designated as the new test pixel, and then the computer 130 loops back to step 702. However, if there are no more edge pixels in the current row as determined at step 710, the computer 130 advances to a decision step 714 wherein a check is made to determine if the last row of the object has been processed. If not, the computer 130 proceeds to step 716, wherein the computer 130 selects the next row and the first edge pixel in that row. This pixel is designated as the new test pixel, and then the computer loops back to step 702. If, at step 714, the computer 130 determined that the last row of the object has just been processed, the computer 130 exits the blend function 540' at a step 718.

Figure 15:
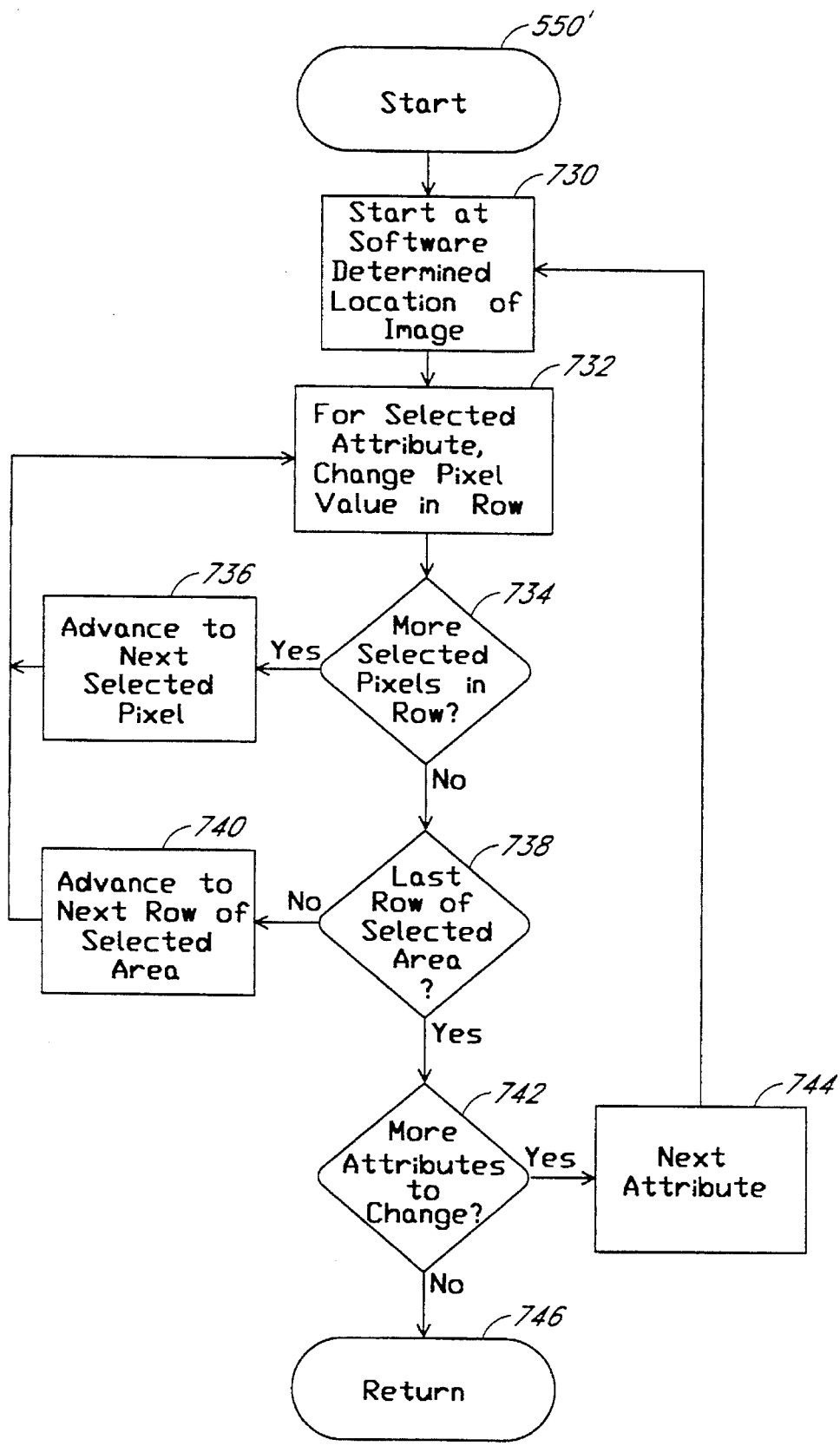
FIG. 15 is a flow diagram of the change gamma function corresponding with block 550 in FIG. 12.

Referring to FIG. 15, the function 550' for changing the gamma attributes of an image will be described. The function 550' is called by the top-level gamma function 262 (FIG. 12). A list of the gamma attributes that may be changed was disclosed in conjunction with FIG. 12. The file header may contain information about the area or object for which a gamma attribute or multiple attributes is to be changed. Depending on the complexity of the background, the header may contain additional information necessary to properly achieve photo-realistic events. The change gamma function allows the user to change one or more gamma attributes on a whole layer or on an area or object on the layer. For example, the saturation attribute can be pumped up from a value of 40 to a value of 80 on the whole layer.

The function 550' starts and proceeds to a step 730 wherein the computer 130 begins processing at a software determined location of the image. This location may be at the X,Y coordinates of the top left corner of an object or area in one embodiment or it may be the entire layer. Moving to step 732, the computer 130 changes the pixel value of the selected attribute, e.g., hue. The computer 130 then moves to a decision step 734 to determine if additional preselected pixels (of the object, area, or layer) in the current row are to have an attribute changed. If so, the computer 130 moves a step 736 and advances to the next pixel in the current row. The computer 130 then loops back to step 732. If there are no additional preselected pixels in the current row as determined by step 734, the computer 130 moves to a decision step 738 to determine if the last row of the selected area has been processed. If not, the computer 130 moves to step 740, advances to the first pixel on the next row of the selected area, and then loops back to step 732. However, if the last row of the selected area, object, or layer has been processed, the computer moves to a decision step 742 wherein a determination is made whether there are any more attributes to change. If so, the computer 130 moves to step 744, gets the next gamma attribute for change, and then loops back to step 730. If there are no further attributes to change, as determined by step 742, the computer 130 exits the change gamma function 550' at a step 746.

Figure 16B:
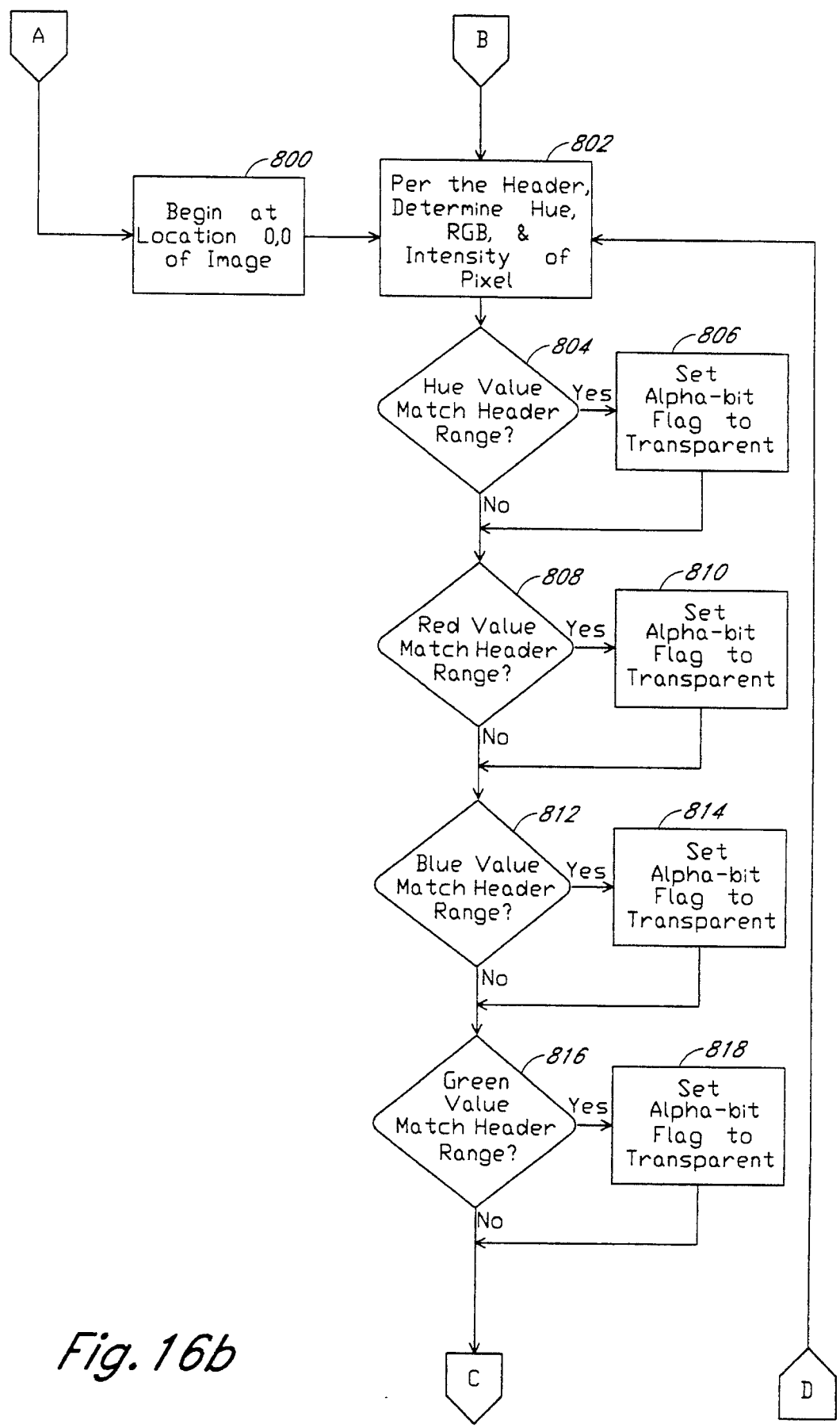
Figure 16C:
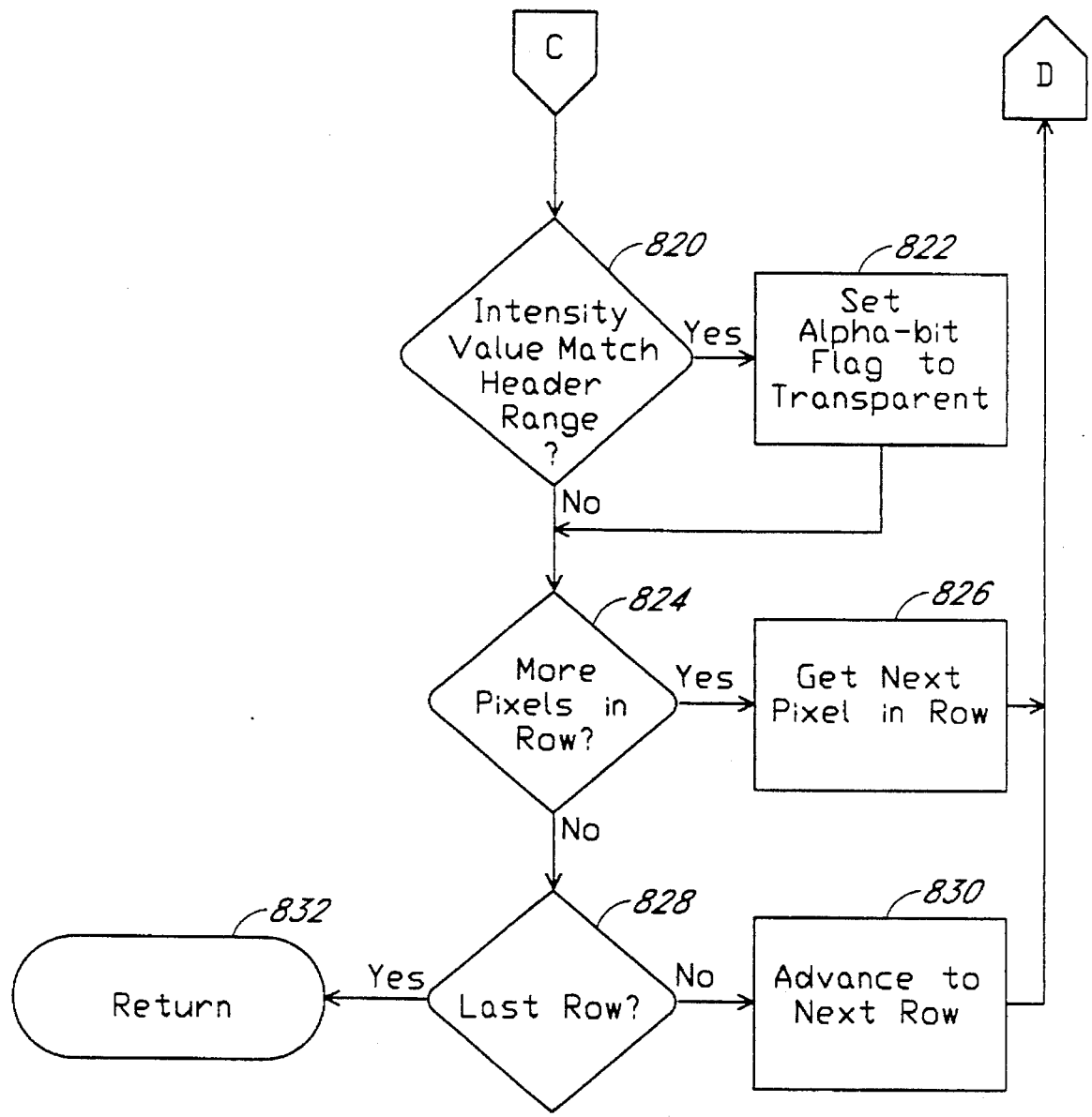

Referring to FIGS. 16a, 16b and 16c the transparency/opacity function 560' (FIG. 16a) will be described. The function 560' is called by the top-level gamma function 262 (FIG. 12). The function 560' starts and proceeds to a decision step 770 wherein the computer 130 determines whether the function is to be performed on an object or on a background scene. If it is determined at step 770 that an object is to be processed, the computer 130 moves to step 772 to begin processing at the first row of the object as defined in the file header. The computer 130 selects an object edge pixel on the current row as the test pixel. The selection of the object edge pixel is made at a software determined address, e.g., the left edge pixel of the first row of the object. Moving to step 774, the computer 130 determines the transparency/opacity (T/O) value of the test pixel. From step 774, the computer 130 proceeds to step 776 and determines the T/O of the background pixel that is on the layer immediately below the selected test pixel in the same row as the test pixel. Then the computer 130 proceeds to step 778 wherein the computer 130 determines the average T/O of the two pixels. From step 778, the computer 130 proceeds to step 780, wherein the computer 130 sets the transparency/opacity of the test pixel according to the blend factor in the calling function.

From step 780, the computer 130 proceeds to a decision step 782, wherein the computer 130 determines whether there are other edges in the current row; that is, whether the test pixel is the last edge pixel to be processed in the current row. If there is at least one additional edge in the current row, the computer moves to step 784 and selects the next edge pixel. This pixel is designated as the new test pixel, and then the computer 130 loops back to step 774. However, if there are no more edge pixels in the current row as determined at step 782, the computer 130 advances to a decision step 786 wherein a check is made to determine if the last row of the object has been processed. If not, the computer 130 proceeds to step 788, wherein the computer 130 selects the next row and the first edge pixel in that row. This pixel is designated as the new test pixel, and then the computer loops back to step 774. If, at step 786, the computer 130 determines that the last row of the object has just been processed, the computer 130 moves to a step 790. At step 790, the computer 130 initializes further processing by accessing the first pixel of the first row of the area made transparent by use of the strip function 234 (FIG. 5).

If the decision step 770 determination is that the function 560' is processing the background scene, the computer 130 moves through off page connector A to a step 800 (FIG. 16b) and accesses the first pixel of the first row of the image as the test pixel. After completion of step 800, the computer 130 moves to a step 802 wherein the file header is utilized to determine which of hue, red, green, blue (RGB), and intensity tests are to be run. Any combination or all five tests can be run. The test is to determine the hue, red, green, blue, or intensity value of the pixel. For each test, a range is kept in the file header along with information that denotes whether the test on the test pixel is for values that are inside the range or for outside the range. The range and the inside/outside information can be different for each of the five tests. As an example, a predetermined limit on hue values may be from zero to 255 and the test may look for pixels that fall outside the hue value range of 50 to 100. These pixels will have their alpha-bit flag set. Thus, of the steps 804, 808, 812, 816, and 820 (FIG. 16c), only those tests selected to run, according to the file header, will have their respective ranges checked. So, for the example just above, the computer 130 moves to a decision step 804 and determines whether the hue value of the test pixel is outside the range specified in the header, e.g. 50 to 100. If so, the computer 130 sets the alpha-bit flag to transparent at step 806. However, if the pixel value does not match the range specification in the file header for hue, as determined by step 804, the computer 130 moves to the next decision block as selected in the file header, if any, among steps 808, 812, 816, and 820. A set of steps similar to steps 804 and 806 above is executed for each test selected in the file header.

At the conclusion of the one to five tests above, the computer 130 moves to a decision step 824 (FIG. 16c) and determines if there is at least one additional pixel in the current row to be tested. If so, the computer 130 advances to step 826, accesses the next pixel in the current row, and loops back to step 802 (FIG. 16b) to repeated the above-described process. If the last pixel on the current row has been processed, as determined by step 824, the computer 130 moves to a decision step 828 to determine if the last row has just been processed. If not, the computer 130 moves to step 830, advances to the next row of the image, and loops back to step 802 (FIG. 16b). If the last row has been processed, as determined by step 828, the computer 130 exits the transparency/opacity function 560' at step 832.

After completion of step 790, the computer 130 moves through off page connector B to step 802 (FIG. 16b). Steps 802 to 832 are then similar to that described above except that for steps 806, 810, 814, 818, and 822 (FIG. 16c), the alpha-bit flag is set opaque rather than transparent, because the area to be processed is already transparent (when step 802 is reached via step 790). As an example, setting the alpha-bits opaque allows the user to make a drop shadow in the shape of the user's head, which is known as shadow preservation.

Figure 17B:
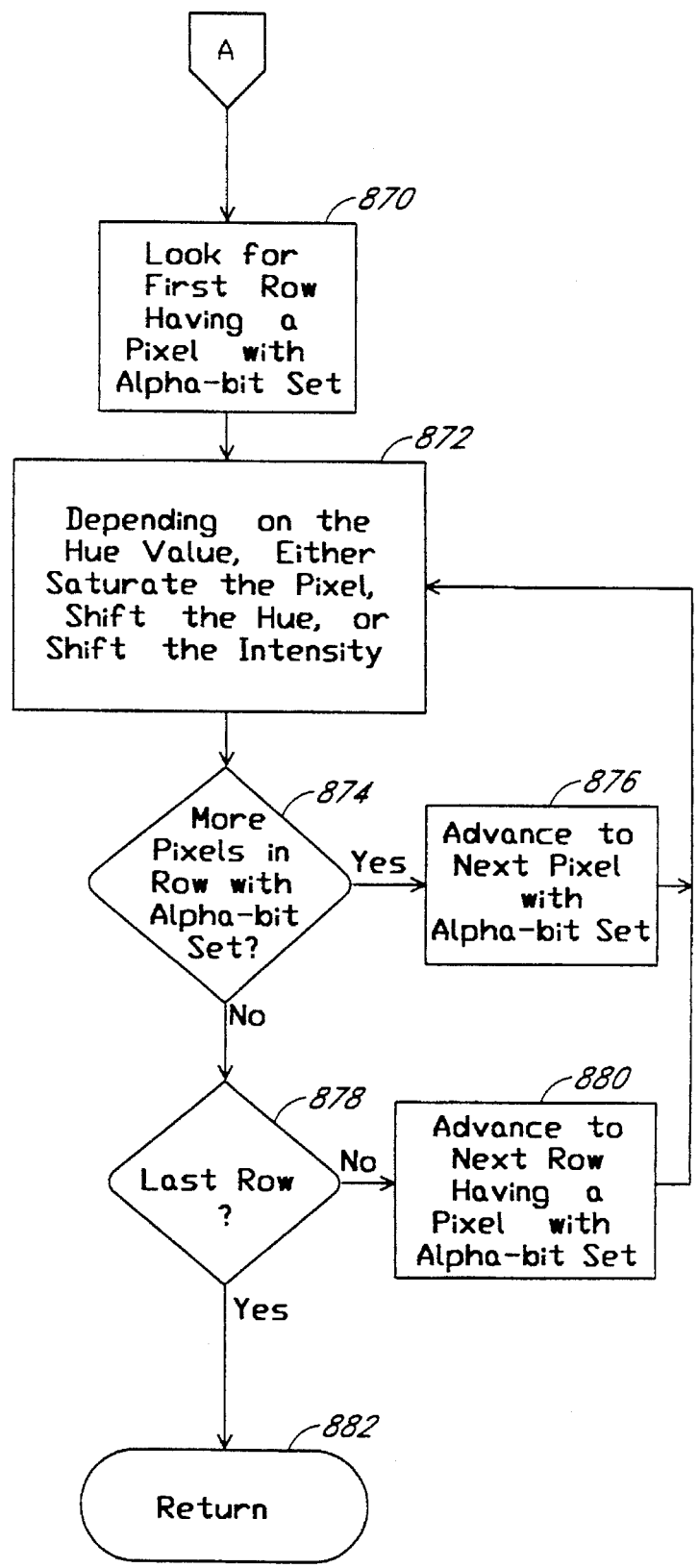

Referring to FIGS. 17a and 17b, the gradient sharpening function 446 will be described. The function 446 is called by the pixel enhancement function 268 (FIG. 9). As an example, the function 446 may be used to locate the eyes on an image of a face so that the eyes could be enhanced while the skin is left unchanged. The function 446 starts and the computer 130 proceeds to a step 850 and accesses the first pixel of the first row as the test pixel of the image that is passed to function 446 from function 268. Moving to step 852, the computer 130 measures the hue of the test pixel and advances to a decision step 854. At step 854, the computer determines whether the hue value falls outside a range specified by the file header, e.g., 110 to 150. If so, e.g., the value is less than 110 or greater than 150, the computer 130 moves to step 856 wherein the alpha-bit flag is set for that pixel. At the completion of step 854 or if the hue value does fall in the range, as determined at step 854, the computer 130 moves to a decision step 858. At step 858, the computer determines if there is at least one additional pixel left in the current row. If so, the computer 130 moves to step 860, accesses the next pixel in the current row and loops back to step 852. However, if the computer 130 determines, at step 858, that the last pixel in the current row has been processed, a decision step 862 determines whether the last row has just been processed. If not, the computer 130 moves to step 864, accesses the next row, and loops back to step 852 to process the new row.

If the determination is made, at step 862, that the last row has been processed, the computer 130 moves through off page connector A to a step 870 (FIG. 17*b*) to look for the first row having a pixel with the alpha-bit flag set. Moving to step 872, the computer 130 does edge enhancement on the pixel. The computer 130 performs one, two or three operations on the pixel, depending on the hue value of the pixel and a set of ranges for the hue value and associated operations which are kept in the file header. The three operations are: saturate the pixel, shift the hue (make the blacks blacker and the whites whiter), and shift the intensity. A set of hue value ranges are set up in the file header such that, for example, if the measured hue value exceeds the file header value by more than 40, the saturation operation is done; if the measured value exceeds the header value by more than 70, the shift intensity operation is done; and if the measured value exceeds the file header value by more than 100, the saturation and the shift hue operations are done. The hue value ranges are background specific, and are set by the programmer to achieve the desired results based on that background. For example, if the skin color of the background object is green, the range will be selected so that the skin color of the object being placed in the background will also match this green color.

Moving to a decision step 874, the computer 130 determines whether there is at least one more pixel in the current row that has the alpha-bit flag set. If so, the computer 130 proceeds to step 876, accesses the next pixel in the current row having the alpha-bit set, and loops back to step 872. However, if decision step 874 is false, the computer 130 moves to a decision step 878 to determine if the last row of the image has just been processed. If not, the computer 130 moves to a step 880, advances to the next row having a pixel with the alpha-bit set, and loops back to step 872. If the last row has been processed, as determined by step 878, the gradient sharpening function 446 returns at step 882 to the pixel enhancement function 268.

The software described herein, some of which is listed in the attached Microfiche Appendix, is written in the "C" language and was translated from source code to machine-readable object code using a Photo Novelty Programming Language (PNPL) compiler developed by ImageWare Software, Inc., formerly Practically Perfect Productions, Inc. of San Diego, Calif. Nonetheless, one skilled in the technology will recognize that the steps in the accompanying flow diagrams can be implemented by using a number of different compilers and/or programming languages.

The image editing system described herein finds application in many environments, and is readily adaptable for use therein. For example, the system finds use in generation of composite photographs where portions of a person's image may replace those of another person's image, such as on a sports team photo. It can be used for production of postcards depicting a person in an exotic location. It also can be used in applications such as production of driver's licenses or security access cards where a person's image is combined with selected other information on a card. Accordingly, the claims are to be interpreted to encompass these and other applications of the invention within their scope and are not to be limited to the embodiments described herein.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

I claim:

1. A method for combining images in three dimensions, comprising the steps of:

providing a plurality of independent components wherein each said component is assigned to one of a plurality of X-Y planes, said X-Y planes being on different levels from each other in the Z direction, and said X-Y planes being overlayed on each other in a direction so as to define relative positions of said components with respect to three dimensions, and so as to define an image of a background;

providing an image of an independent object to be positioned with respect to the image of the background, wherein the position of said image of said object is defined in the X, Y and Z directions with respect to said plurality of said X-Y planes; and positioning the image of the object with respect to the image of the background to form a first composite image, while maintaining the independence of the components and the object, wherein a portion of a component which is closer than the object to a viewing location in the Z direction and which corresponds to the position of a first portion of the object in the X-Y plane will obscure said first portion of the object from view and wherein a portion of a component which is further than the object from the viewing location in the Z direction, and which corresponds to the position of a second portion of the object in the X-Y plane will be obscured from view;

wherein the objects and the components are comprised of at least one pixel and wherein each pixel has a plurality of attributes, a one of said attributes indicative of substantial transparency by the pixel to pixels on underlyinq X-Y planes.

2. The method of claim 1, wherein the step of providing a plurality of independent components comprises the step of providing digitized components, wherein the step of providing an image of an independent object comprises providing a digitized image of an object, and wherein the positioning step comprises the step of positioning said digitized images to form a digitized first composite image.

3. The method of claim 2, wherein the digitized image of the object has a plurality of pixels, and wherein only a portion of the digitized image of the object is to be combined with the digitized image of the background, and wherein the portion of the image of the object to be combined with the image of the background is bordered by an object edge having a first hue, and an object background having a second hue and wherein, prior to the positioning step, the method comprises:

locating said object edge by comparing, for object background pixels and some of, but not all, the object pixels, the hues of the pixels with a predetermined hue; and removing the object background from the image of the object using the located edge.

4. The method of claim 1, wherein, prior to the positioning step, the method comprises the steps of:

providing a representation of size of a selected portion of the background image;

providing a representation of size of a portion of the object image that is to be combined with the background image;

comparing the representation of size of the portion of the object image with the representation of the size of the selected portion of the background image to determine their relative sizes; and changing the size of the image of the object to be combined in response to the results of the comparison step.

5. The method of claim 4, wherein the selected portion of the background image is that portion of said background image which is to be replaced by the object to be combined.

6. The method of claim 5, wherein the selected portion of the background image includes an image of a first person's head, and wherein the portion of the object image to be combined includes an image of a second person's head, and wherein the representation of size of the selected portion of the background image comprises the distance between selected features of the first person's head, and wherein the representation of size of the object image that is to be combined comprises the distance between selected features of the second person's head.

7. The method of claim 6, wherein the distance between selected features of the first and second person's heads comprise, respectively, the distance between the bottom of the chin and a line which extends between the pupils of the eyes of the head.

8. The method defined in claim 1, additionally comprising the step of transforming a portion of the object having a selected attribute, such that said portion becomes transparent.

9. The method defined in claim 1, additionally comprising the step of transforming a portion of at least one component having a selected attribute, such that said portion becomes transparent.

10. The method defined in claim 1, wherein the object is stored in a file.

11. The method defined in claim 1, wherein the positioning step further comprises the steps of:

specifying a position of a location designator on said object image;

retrieving an address of a location designator of an object in said background image having a corresponding relationship to the object image in said specifying step; and assigning said address to said location designator of said object image.

12. An apparatus for combining images in three dimensions, comprising:

means for providing a plurality of independent components wherein each said component is assigned to one of a plurality of X-Y planes, said X-Y planes being on different levels from each other in the Z direction, and said X-Y planes being overlayed on each other in a direction so as to define relative positions of said components with respect to three dimensions, and so as to define an image of a background;

means for providing an image of an independent object to be positioned with respect to the image of the background, wherein the position of said image of said object is defined in the X, Y and Z directions with respect to said plurality of said X-Y planes; and means for positioning the image of the object with respect to the image of the background to form a first composite image, while maintaining the independence of the components and the object, wherein a portion of a component which is closer than the object to a viewing location in the Z direction and which corresponds to the position of a first portion of the object in the X-Y plane will obscure said first portion of the object from view and wherein a portion of a component which is further than the object from the viewing location in the Z direction, and which corresponds to the position of a second portion of the object in the X-Y plane will be obscured from view;

wherein the objects and the components are comprised of at least one pixel and wherein each pixel has a plurality of attributes, a one of said attributes indicative of substantial transparency by the pixel to pixels on underlying X-Y planes.

13. The apparatus defined in claim 12, additionally comprising means for making transparent a portion of the object having a selected attribute.

14. The apparatus defined in claim 12, additionally comprising means for making transparent a portion of at least one component having a selected attribute.

15. The apparatus defined in claim 12, additionally comprising:

a computer having a memory for storing the object image, wherein the object image includes an object bordered by an edge having a first hue, and a background having a second hue;

means for locating said edge in said object image by comparing, for background pixels and some of, but not all, object pixels, said first hue and said second hue of said object pixels and said background with a predetermined hue; and means for removing said background from said object image using said located edge.

16. The apparatus of claim 15, wherein each hue is characterized by a numeric value.

17. The apparatus of claim 16, wherein the means for locating the edge determines the difference between a numeric hue value of one pixel and a numeric hue value of a contiguous pixel, and compares the difference to a predetermined difference, and wherein the predetermined hue for each comparison is the hue of the adjacent pixel.

18. The apparatus of claim 15, wherein the means for removing the background from the object image sets all background pixels to a preselected transparent value.

19. The apparatus of claim 15, additionally comprising a video camera connected to the computer, the camera generating a signal which is stored as the object image.

20. The apparatus of claim 15, additionally comprising a video monitor connected to the computer for displaying the object image.

21. The apparatus of claim 15, additionally comprising a printer connected to the computer for generating a hard copy image, the system also comprising a currency acceptor connected to the computer for accepting currency and activating the system in response thereto.

22. In a graphics system having a plurality of image layers, a method of editing an image, comprising the steps of:

providing a digitized image having a plurality of pixels, wherein each pixel has a plurality of attributes, a one of said attributes indicative of substantial transparency by the pixel to pixels on underlyinq layers, and wherein the image has a plurality of components, each component comprising at least one of said pixels and being located on a selected layer of the image;

selecting an image modification operation from a plurality of image modification operations;

selecting at least one of said attributes or said components to modify;

storing the selected operation and selected attribute or component in a memory;

prioritizing the layers of the image based on the selected operation;

identifying at least one layer to be operated on by the operation;

performing the selected operation on a layer by layer basis in response to the prioritizing step and the identifying step.

23. The method defined in claim 22, additionally comprising the steps of:

selecting another image modification operation from the plurality of image modification operations;

selecting at least one other of said attributes or said components to modify; and repeating the steps of storing, prioritizing, identifying and performing with respect to said another operation and said selected other of said attributes or said components.

24. In a graphics system utilizing a plurality of image layers, a method of layer manipulation, comprising the steps of:

providing a digitized image having a plurality of objects, each object being located on a selected layer of the image and wherein each object is comprised of at least one pixel;

identifying at least one object from the image;

writing an alpha-bit flag of each pixel for each identified object to a memory, wherein the alpha-bit flag is indicative of substantial transparency by pixels of the object to pixels at the same X-Y layer position on underlying layers; and displaying each identified object based on the alpha-bit flag of the pixels for the identified object.

25. The method defined in claim 24 wherein, when two or more objects are selected in the identifying step, the method additionally comprises the step of stitching said selected objects into one collection on one layer of the image.

26. The method defined in claim 24, additionally comprising the steps of:

stitching said at least one selected object into said image; and removing said at least one selected object from said memory.

27. The method defined in claim 24, wherein said memory comprises a linked list.

* * * * *

UNITED STATES PATENT AND TRADEMARK OFFICE
CERTIFICATE OF CORRECTION

PATENT NO. : 5,577,179

DATED : November 19, 1996

INVENTOR(S) : Blank

It is certified that error appears in the above-identified patent and that said Letters Patent is hereby corrected as shown below:

Column 5, Line 57 reads

FIGS. 3a, 3b, 3c, 3d "and 3c" are and should read

FIGS. 3a, 3b, 3c, 3d --and 3e-- are

Column 9, Line 53 reads flow 200 leaves FIG. "3e" through and should read flow 200 leaves FIG. --3c-- through Attest:

*Attesting Officer*

Signed and Sealed this

Fifth Day of May, 1998

BRUCE LEHMAN

*Commissioner of Patents and Trademarks*